(12) United States Patent
Okano et al.

(10) Patent No.: US 7,837,280 B2
(45) Date of Patent: Nov. 23, 2010

(54) VEHICLE BRAKE SYSTEM

(75) Inventors: Takahiro Okano, Toyota (JP); Akihiro Otomo, Toyota (JP); Tsukasa Fukasawa, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 611 days.

(21) Appl. No.: 11/695,832

(22) Filed: Apr. 3, 2007

(65) Prior Publication Data

US 2007/0252428 A1 Nov. 1, 2007

(30) Foreign Application Priority Data

Apr. 28, 2006 (JP) ............... 2006-125450

(51) Int. Cl.
*B60T 8/34* (2006.01)
(52) U.S. Cl. ............... 303/113.5; 303/9.71; 303/116.2; 303/119.1
(58) Field of Classification Search ............. 303/113.1, 303/113.5, 116.1, 116.2, 119.1, 186, 187, 303/188, 9.62, 9.71
See application file for complete search history.

(56) References Cited

U.S. PATENT DOCUMENTS

| 5,163,742 A | * | 11/1992 | Topfer et al. ............. 303/155 |
| 5,284,385 A | * | 2/1994 | Muller et al. ............. 303/9.71 |
| 5,646,849 A | * | 7/1997 | Walenty et al. ........... 303/186 |
| 5,855,419 A | * | 1/1999 | Urai et al. ................ 303/186 |
| 6,460,942 B1 | * | 10/2002 | Shimizu et al. .......... 303/113.1 |
| 2003/0205928 A1 | | 11/2003 | Harris et al. |
| 2006/0066146 A1 | | 3/2006 | Otomo |

FOREIGN PATENT DOCUMENTS

| JP | 03-153450 A | 7/1991 |
| JP | 10-315946 | 12/1998 |
| JP | 11-078839 A | 3/1999 |
| JP | 11-153105 A | 6/1999 |
| JP | 11-180294 | 7/1999 |
| JP | 2006-123889 A | 5/2006 |
| JP | 2007-118810 A | 5/2007 |
| JP | 2007-196924 A | 8/2007 |
| WO | WO 02/32734 A1 | 4/2002 |
| WO | 1 642 795 A1 | 4/2006 |

* cited by examiner

*Primary Examiner*—Thomas J Williams
(74) *Attorney, Agent, or Firm*—Oblon, Spivak, McClelland, Maier & Neustadt, L.L.P.

(57) ABSTRACT

A hydraulic brake unit applies braking force to a plurality of wheels of a vehicle according to the operation of a brake pedal. A pressure increase linear control valve supplies hydraulic fluid from an accumulator to wheel cylinders of disc brake units of the respective wheels. Pressure-sustaining valves are placed in passages that extend from a first passage to the rear wheel cylinders. A pressure-increase response-delay reduction section closes the pressure-sustaining valves for a predetermined period of time after starting the hydraulic pressure control to temporarily limit the inflow of hydraulic fluid into the wheel cylinders that communicate with the first passage. Thus, the amount of the hydraulic fluid that is supplied to the second passage is increased, and it is possible to reduce the hydraulic pressure response delay in the second passage.

15 Claims, 9 Drawing Sheets

VEHICLE BRAKE SYSTEM

INCORPORATION BY REFERENCE

The disclosure of Japanese Patent Application No. 2006-125450 filed on Apr. 28, 2006 including the specification, drawings and abstract is incorporated herein by reference in its entirety.

BACKGROUND OF THE INVENTION

1. Field of Invention

The present invention relates to a vehicle brake system for applying braking force to a plurality of wheels of a vehicle according to the operation of a brake pedal.

2. Description of Related Art

Electronically-controlled vehicle brake systems that controls the braking force by regulating, via a pressure source and a hydraulic pressure controller, the hydraulic pressure that is supplied to wheel cylinders, are available. By using such a vehicle brake system, it is possible to reduce the cost by reducing the number of control valves for sustaining pressure and control valves for reducing pressure to be installed. A vehicle brake system having a pair of linear control valves that are used for sustaining and reducing pressure, respectively, and having a hydraulic fluid passage that is separated by a communication valve into two passages that communicate with different wheel cylinders of the disc brakes that are installed for the respective wheels is described in Japanese Patent Application Publication No. 11-180294 (JP-A-11-180294).

However, when two passages are connected to each other with the communication valve interposed therebetween in the hydraulic fluid passage as described in JP-A-11-180294, the communication valve serves as a throttle orifice, and can cause the difference in the hydraulic pressure response between both sides of the communication valve when the pressure is changed.

SUMMARY OF THE INVENTION

The present invention provides a technology for reducing the difference in the hydraulic pressure response between passages when hydraulic fluid is supplied from a single hydraulic pressure source to a plurality of passages that individually communicate with the different wheel cylinders of the respective wheels.

A first aspect of the present invention relates to a vehicle brake system for applying braking force to a plurality of wheels of a vehicle. This system includes: a wheel cylinder, provided at each wheel, that produces the braking force through hydraulic pressure; a hydraulic pressure source that supplies hydraulic fluid that has been pressurized; a hydraulic pressure supply passage for supplying hydraulic pressure from the hydraulic pressure source to the wheel cylinder; a pressure increase control valve, which is disposed in the hydraulic pressure supply passage, for supplying hydraulic pressure from the hydraulic pressure source to the wheel cylinder according to operation of a brake pedal; a communication valve that is placed in a channel of the hydraulic fluid extending from the pressure increase control valve to the wheel cylinder, and that separates the channel, as needed, into an upstream-side first passage that communicates with at least one wheel cylinder, and a downstream-side second passage that communicates with the wheel cylinder other than the wheel cylinder that communicates with the first passage, wherein the first passage is closer to the pressure increase control valve than the second passage; a pressure-reducing passage for discharging the hydraulic fluid from the wheel cylinder; a pressure reduction control valve, which is disposed between the pressure-reducing passage and the first passage, for controlling the flow of the hydraulic fluid that is discharged from the wheel cylinder; a pressure-sustaining valve, which is disposed in each channel that extends from the first passage to the wheel cylinder and in each channel that extends from the second passage to the wheel cylinder, for controlling supply of hydraulic fluid to the wheel cylinder; a pressure-reducing valve placed between the pressure-reducing passage and each wheel cylinder; and a response delay reduction section for reducing a response delay in pressure increase/decrease in the second passage relative to pressure increase/decrease in the first passage when the pressure increase/decrease control of the wheel cylinder is performed by supplying hydraulic pressure using the pressure increase control valve, or by releasing hydraulic pressure using the pressure reduction control valve.

According to this aspect, it is possible to reduce the difference in the hydraulic pressure response between the passages in the vehicle brake system in which a single pressure increase control valve and a single pressure reduction control valve are provided for the plurality of passages that individually communicate with the different wheel cylinders of the respective wheels.

A second aspect of the present invention also relates to a vehicle brake system for applying braking force to a plurality of wheels of a vehicle. A system according to the second aspect includes: a wheel cylinder, provided at each wheel, that produces the braking force by using hydraulic pressure; a hydraulic pressure source that supplies hydraulic fluid that has been pressurized; a hydraulic pressure supply passage for supplying hydraulic pressure from the hydraulic pressure source to the wheel cylinder; a pressure increase control valve, which is disposed in the hydraulic pressure supply passage, for supplying hydraulic pressure from the hydraulic pressure source to the wheel cylinder according to operation of a brake pedal; a communication valve that is placed in a channel of the hydraulic fluid extending from the pressure increase control valve to the wheel cylinder, and that separates the channel, as needed, into an upstream-side first passage that communicates with at least one wheel cylinder, and a downstream-side second passage that communicates with the wheel cylinder other than the wheel cylinder that communicates with the first passage, wherein the first passage is closer to the pressure increase control valve than the second passage; a pressure-sustaining valve, which is disposed in each channel that extends from the first passage to the wheel cylinder and in each channel that extends from the second passage to the wheel cylinder, for controlling supply of hydraulic fluid to the wheel cylinder; and a pressure-increase response-delay reducing section that temporarily limits inflow of the hydraulic fluid into the wheel cylinder that communicates with the first passage when the pressure increase control of the wheel cylinder is performed using the pressure increase control valve.

According to this aspect, the amount of the hydraulic fluid that is supplied to the second passage may be regulated by temporarily limiting the supply of the hydraulic fluid to the wheel cylinders communicating with the first passage located on the side near the pressure-sustaining valve, by using the pressure-increase response-delay reducing section. Accordingly, it is possible to reduce the response delay in the pressure increase in the second passage relative to the pressure increase in the first passage that is caused by supplying the hydraulic fluid from a single hydraulic pressure source to the first and second passages that are allowed to communicate with each other via the communication valve.

The pressure-increase response-delay reducing section may close, for a predetermined period of time after the pressure increase control is started, the pressure-sustaining valve that communicates with the first passage. Supplying hydraulic fluid to the wheel cylinders that communicate with the second passage is performed before supplying hydraulic fluid to the wheel cylinders that communicate with the first passage, by closing the pressure-sustaining valves that communicate with the first passage, after starting the pressure increase control. Accordingly, the pressure in the second passage is increased earlier than the pressure in the first passage, so that it is possible to reduce the response delay in the pressure increase in the second passage relative to the pressure increase in the first passage.

The pressure-increase response-delay reducing section may perform, for a predetermined period of time after the pressure increase control is started, the duty cycle control of the pressure-sustaining valve that communicates with the first passage. A greater amount of hydraulic fluid may be supplied to the wheel cylinders that communicate with the second passage by reducing the amount of the hydraulic fluid that flows into the wheel cylinders that communicate with the first passage, by performing the duty cycle control of the pressure-sustaining valves that communicate with the first passage, after starting the pressure increase control. Accordingly, the response delay in the pressure increase in the second passage may be reduced relative to the pressure increase in the first passage by increasing the pressure in the second passage earlier than the pressure in the first passage.

The vehicle brake system may further include: an overshoot detection section that detects whether the pressure increase control overshoots a desired hydraulic pressure in the first passage, wherein, if the overshoot is detected, the pressure-increase response-delay reducing section closes, for a predetermined period of time, the pressure-sustaining valve that communicates with the first passage. If the pressure-sustaining valves that communicate with the first passage are closed when the overshoot in the first passage is detected, the hydraulic fluid that is supplied from the hydraulic pressure source via the pressure increase control valve flows into the second passage instead of the wheel cylinders that communicate with the first passage. Accordingly, it is possible to reduce the overshoot beyond the desired hydraulic pressure in the first passage.

The overshoot detection section may detect the overshoot in the first passage by comparing a predetermined threshold value and a difference between a rotation speed of a front wheel of the vehicle and a rotation speed of a rear wheel of the vehicle. Alternatively, the overshoot detection section may detect the overshoot in the first passage by comparing a predetermined threshold value and an amount of change in a rotation speed of a wheel (e.g. a rear wheel) assigned to the wheel cylinder that communicates with the first passage. Alternatively, the overshoot detection section may detect the overshoot in the first passage by comparing a predetermined pressure with the pressure in the first passage and the pressure in the second passage.

A third aspect of the present invention relates to a vehicle brake system for applying braking force to a plurality of wheels of a vehicle. The system includes: a wheel cylinder, provided at each wheel, that produces the braking force by using hydraulic pressure; a hydraulic pressure source that supplies hydraulic fluid that has been pressurized; a hydraulic pressure supply passage for supplying hydraulic pressure from the hydraulic pressure source to the wheel cylinder; a pressure increase control valve, which is disposed in the hydraulic pressure supply passage, for supplying hydraulic pressure from the hydraulic pressure source to the wheel cylinder according to operation of a brake pedal; a communication valve that is placed in a channel of the hydraulic fluid extending from the pressure increase control valve to the wheel cylinder, and that separates the channel, as needed, into an upstream-side first passage that communicates with at least one wheel cylinder, and a downstream-side second passage that communicates with the wheel cylinder other than the wheel cylinder that communicates with the first passage, wherein the first passage is closer to the pressure increase control valve than the second passage; a pressure-reducing passage for discharging the hydraulic fluid from the wheel cylinder; a pressure reduction control valve, which is disposed between the pressure-reducing passage and the first passage, for controlling the flow of the hydraulic fluid that is discharged from the wheel cylinder; a pressure-reducing valve placed between the pressure-reducing passage and each wheel cylinder; a pressure sensor for detecting the hydraulic pressure in the second passage; and a pressure-reduction response-delay reducing section that, when the pressure reduction control of the wheel cylinder is performed using the pressure reduction control valve based on the hydraulic pressure in the second passage, opens, for a predetermined period of time, the pressure-reducing valve assigned to the wheel cylinder that communicates with the second passage.

According to the third aspect, the route that leads the hydraulic pressure from the wheel cylinders located on the second passage side to the pressure-reducing passage is opened, in addition to the route passing through the communication valve and the pressure reduction control valve, by opening the pressure-reducing valves located on the second passage side when the pressure reduction control is performed. In this way, it is possible to increase the pressure reduction gradient in the second passage. Thus, it is possible to reduce the response delay in the pressure reduction in the second passage relative to the pressure reduction in the first passage that is caused by the pressure reduction using the single pressure reduction control valve for the first and second passages that communicate with each other via the communication valve.

The vehicle brake system may further include a response delay determination section that determines whether the pressure reduction response delay is occurring in the second passage. In this case, the pressure-reduction response-delay reducing section may open the pressure-reducing valve if it is determined there is a delay in the pressure reduction response.

The pressure reduction control valve may be a linear control valve that controls the opening degree of the linear control valve according to the opening degree command value that is based on the hydraulic pressure in the second passage. The vehicle brake system may further include an opening degree correction section for correcting an opening degree command value in order to eliminate the influence of opening the pressure-reducing valve on the hydraulic pressure in the second passage. When the pressure-reducing valves that communicate with the second passage are opened, the hydraulic pressure in the second passage drops, and the opening degree of the pressure reduction control valve that is controlled based on this hydraulic pressure is also decreased. However, it is possible to maintain the appropriate opening degree by correcting the opening degree command value of the pressure reduction control valve.

The vehicle brake system may further include: a regenerative braking unit that substitutes regenerative braking force of an electric motor for part of the braking force applied to the plurality of wheels of the vehicle; and a cooperative control unit for controlling of the hydraulic braking force and the regenerative braking force cooperatively. In this case, when the cooperative control unit is executing the cooperative control of the hydraulic braking force and the regenerative braking force, the opening degree correction section corrects the opening degree command value, based on the hydraulic pressure in the second passage and the time during which the pressure-reducing valve is opened.

The hydraulic pressure source may include a master cylinder that generates pressure when the brake pedal is depressed, and the vehicle brake system may further include a master cylinder pressure sensor for detecting the pressure generated by the master cylinder. In this case, when the cooperative control unit is not executing the cooperative control of the hydraulic braking force and the regenerative braking force, the opening degree correction section corrects the opening degree command value, based on the pressure generated by the master cylinder. It is possible to inhibit the opening degree of the pressure reduction control valve from decreasing when the pressure-reducing valves that communicate with the second passage are opened, by using the master cylinder pressure value, instead of the value of the hydraulic pressure in the second passage, as the opening degree command value of the pressure reduction control valve.

With the present invention, it is possible to reduce the difference in the hydraulic pressure response between passages when hydraulic fluid is supplied from a single hydraulic pressure source to a plurality of passages that individually communicate with the different wheel cylinders of the respective wheels.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Example embodiments according to the present invention will be described in detail below with reference to the drawings.

Figure 1:
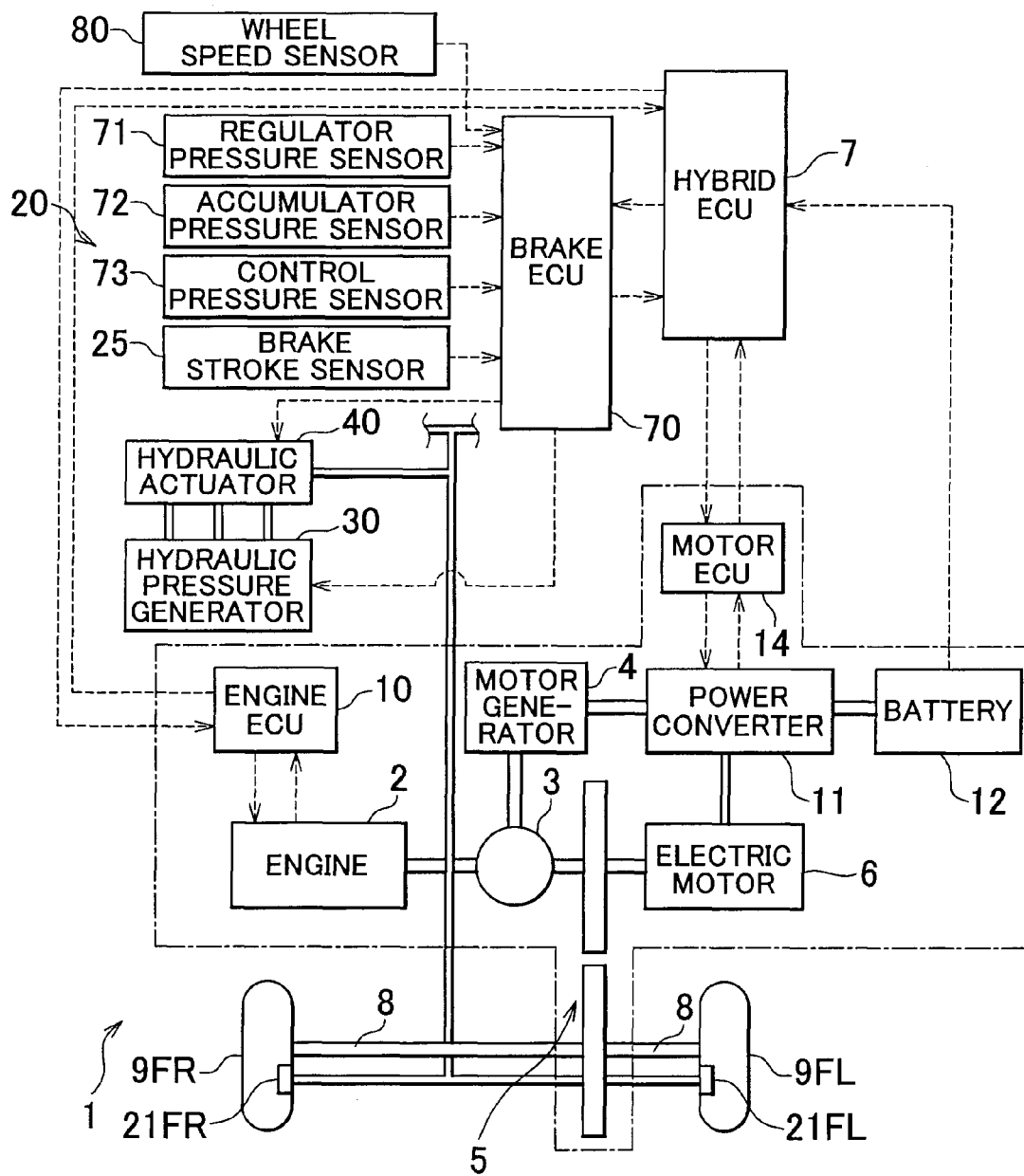
FIG. 1 is a schematic configuration diagram showing a vehicle in which a vehicle brake system according to a first embodiment is used.

A first embodiment of the present invention is shown in FIG. 1, which depicts the schematic configuration of a vehicle in which a vehicle brake system is used. The vehicle 1 shown in FIG. 1 is a hybrid vehicle. The vehicle 1 includes: an engine 2; a three-shaft power splitting mechanism 3 connected to a crankshaft, which is the output shaft of the engine 2; a motor generator 4 that generates electricity, which is connected to the power splitting mechanism 3; an electric motor 6 connected to the power splitting mechanism 3 with a transmission 5 interposed between the electric motor 6 and the power splitting mechanism 3; and an electronic control unit 7 for a hybrid drive system (hereinafter referred to as "the hybrid ECU"; every electronic control unit is herein expressed using the abbreviation, "ECU"), which controls the whole drive system of the vehicle 1. Right and left front wheels 9FR and 9FL, which are driven wheels of the vehicle 1, are connected to the transmission 5 via a drive shaft 8.

The engine 2 is an internal combustion engine that operates using hydrocarbon fuel, such as gasoline and light oil, and is controlled by an engine ECU 10. The engine ECU 10 communicates with the hybrid ECU 7. The engine ECU 10 controls the fuel injection, the ignition timing, the air intake, etc, of the engine 2, based on the control signal from the hybrid ECU 7, and the signals from various sensors that monitor the operational state of the engine 2. The engine ECU 10 provides the hybrid ECU 7 with information concerning the operational state of the engine 2 as needed.

The power splitting mechanism 3 has several functions. The first function is to transmit the output power of the electric motor 6 to the right and left front wheels 9FR and 9FL via the transmission 5. The second function is to distribute the output power of the engine 2 to the motor generator 4 and the transmission 5. The third function is to decrease or increase the rotation speed of the electric motor 6 and the engine 2. The motor generator 4 and the electric motor 6 are connected to a battery 12 with a power converter 11 interposed therebetween. The power converter 11 includes an inverter. A motor ECU 14 is connected to the power converter 11. The motor ECU 14 also communicates with the hybrid ECU 7. The motor ECU 14 controls the motor generator 4 and the electric motor 6 via the power converter 11, based on the control signal from the hybrid ECU 7 and the like. Each of the hybrid ECU 7, the engine ECU 10, and the motor ECU 14 is a microprocessor including a CPU. Each of the hybrid ECU 7, the engine ECU 10, and the motor ECU 14 includes a ROM for storing various programs, a RAM for temporarily storing data, an I/O port, a communication port, etc, in addition to the CPU.

Electric power is supplied from the battery 12 to the electric motor 6 via the power converter 11 under the control of the hybrid ECU 7 and the motor ECU 14, so that the right and left front wheels 9FR and 9FL are driven by the output power of the electric motor 6. The vehicle 1 is driven by the engine 2 in an operational range in which the engine efficiently operates. In this case, it is made possible to drive the electric motor 6 and to charge the battery 12 via the power converter 11, using the electric power generated by the motor generator 4, by transmitting part of the output power of the engine 2 to the motor generator 4 via the power splitting mechanism 3.

When the vehicle 1 is braked, the electric motor 6 is rotated by the power transmitted from the front wheels 9FR and 9FL under the control of the hybrid ECU 7 and the motor ECU 14, so that the electric motor 6 is caused to function as a electric generator. Specifically, the electric motor 6, the power converter 11, the hybrid ECU 7 and the motor ECU 14 serves as part of a regenerative braking unit for braking the vehicle 1 by converting the kinetic energy of the vehicle 1 to electric energy.

The vehicle brake system of this embodiment includes a hydraulic brake unit 20, in addition to such a regenerative braking unit. The vehicle brake system makes it possible to brake the vehicle 1 by executing cooperative control of regenerative braking that makes the regenerative braking unit and the hydraulic brake unit cooperate with each other. The hydraulic brake unit 20 will be described with reference to FIG. 2. The hydraulic brake unit 20 includes disc brake units 21FR, 21FL, 21RR and 21RL ("disc brake units 21", when referred to collectively), which are provided for the right and left front wheels 9FR and 9FL shown in FIG. 1, and the right and left rear wheels (not shown), respectively. The hydraulic brake unit 20 further includes: a hydraulic pressure generator 30, which serves as a source of brake oil as a hydraulic fluid for the disc brake units 21; and a hydraulic actuator 40 that can set the braking force of the wheels of the vehicle 1 by supplying the hydraulic pressure of the brake oil from the hydraulic pressure generator 30 to the disc brake units 21 while appropriately regulating the hydraulic pressure.

Each of the disc brake units 21 includes a brake disc 22 and a brake caliper 23. Each brake caliper 23 incorporates a wheel cylinder (not shown). The wheel cylinders of the brake caliper 23 are connected to the hydraulic actuator 40 via individual fluid passages. When brake oil is supplied from the hydraulic actuator 40 to the wheel cylinder of the brake caliper 23, a brake pad as a frictional member is pressed against the brake disc 22 that rotates with a wheel, so that hydraulic braking torque is applied to the wheel.

Figure 2:
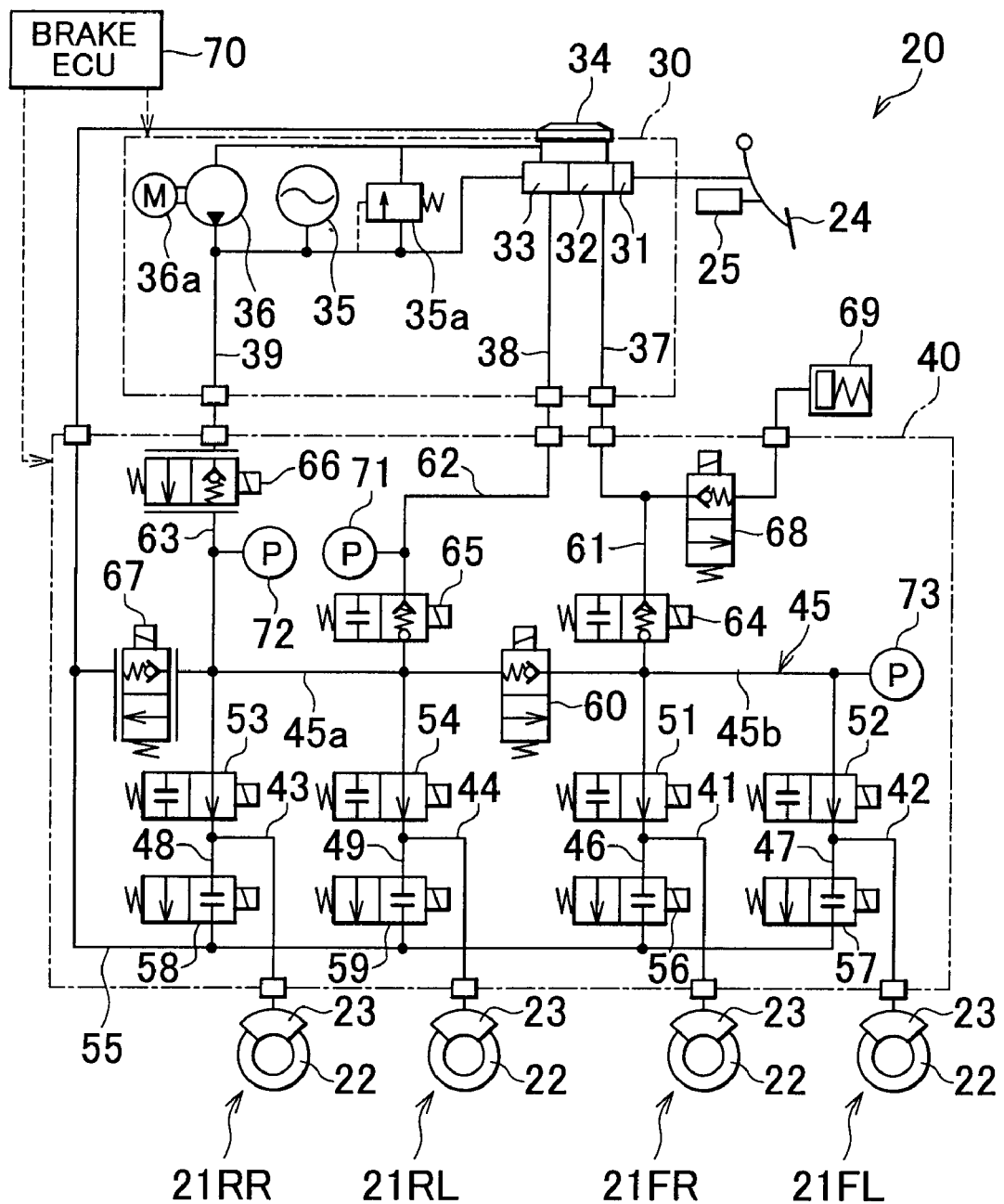
FIG. 2 is a diagram showing a configuration of a hydraulic brake unit.

As shown in FIG. 2, the hydraulic pressure generator 30 includes a booster 31, a master cylinder 32, a regulator 33, a reservoir 34, an accumulator 35, and a pump 36. The booster 31, which is coupled to a brake pedal 24, boosts the pedal depression force applied to the brake pedal 24, and transmits the boosted force to the master cylinder 32. The master cylinder 32 generates a master cylinder pressure that is obtained by boosting the pedal depression force at a predetermined boost ratio. The brake pedal 24 is provided with a brake stroke sensor 25 for detecting the operation amount of the brake pedal 24.

The reservoir 34 for storing brake oil is placed above the master cylinder 32 and the regulator 33. The master cylinder 32 communicates with the reservoir 34 when the brake pedal 24 is released. The regulator 33 communicates with both the reservoir 34 and the accumulator 35. The regulator 33 uses the reservoir 34 and the accumulator 35 as a low-pressure source and a high-pressure source, respectively, and generates a hydraulic pressure (hereinafter referred to as "the regulator pressure") that is substantially equal to the master cylinder pressure.

The accumulator 35 accumulates the pressure energy of the brake oil supplied from the reservoir 34 that has been pressurized by the pump 36 as the pressure energy (about 14 to 22 MPa, for example) of the enclosed gas, such as nitrogen gas. The pump 36 has a motor 36a as a driving power source. The suction port of the pump 36 is connected to the reservoir 34. The discharge port of the pump 36 is connected to the accumulator 35. In addition, a relief valve 35a for the accumulator 35 is provided. When the pressure of the brake oil in the accumulator 35 abnormally increases, to about 25 MPa, for example, the relief valve 35a opens, and the high-pressure brake oil is returned to the reservoir 34.

As described above, the hydraulic pressure generator 30 includes the master cylinder 32, the regulator 33, and the accumulator 35, as a brake-oil supply source (hydraulic pressure source) for the disc brake units 21. Fluid passages 37, 38 and 39 are connected to the master cylinder 32, the regulator 33 and the accumulator 35, respectively. These fluid passages 37, 38 and 39 are individually connected to the hydraulic actuator 40.

The hydraulic actuator 40 includes an actuator block in which a plurality of fluid passages are formed, and a plurality of electromagnetically-controlled valves. The fluid passages formed in the actuator block include individual passages 41, 42, 43 and 44, as well as a primary passage 45. The individual passages 41 to 44 branch off from the primary passage 45, and are connected to the corresponding disc brake units 21FR, 21FL, 21RR and 21RL. Thus, the disc brake units 21 are allowed to communicate with the primary passage 45. Pressure-sustaining valves 51, 52, 53 and 54 are provided in the individual passages 41, 42, 43 and 44, respectively. Each of the pressure-sustaining valves 51 to 54 has a spring and a solenoid that is switched on and off, and is a normally-open electromagnetically-controlled valve, which is opened when the solenoid is not energized.

The disc brake units 21 are connected to a pressure-reducing passage 55 via pressure-reducing passages 46, 47, 48 and 49, respectively, which are connected to the individual passages 41 to 44, respectively. Pressure-reducing valves 56, 57, 58 and 59 are provided in the pressure-reducing passages 46, 47, 48 and 49, respectively. Each of the pressure-reducing valves 56 to 59 has a spring and a solenoid that is switched on and off, and is a normally-closed electromagnetically-controlled valve, which is closed when the solenoid is not energized.

A communication valve 60 is provided in the primary passage 45. The communication valve 60 divides the primary passage 45 into a first passage 45a, which is connected to the individual passages 43 and 44, and a second passage 45b, which is connected to the individual passages 41 and 42. Specifically, the first passage 45a is connected to the rear-wheel disc brake units 21RR and 21RL via the individual passages 43 and 44, and the second passage 45b is connected to the front-wheel disc brake units 21FR and 21FL via the individual passages 41 and 42. The communication valve 60 has a spring and a solenoid that is switched on and off, and is a normally-closed electromagnetically-controlled valve.

A master-cylinder passage 61 connected to the fluid passage 37 that communicates with the master cylinder 32, a regulator passage 62 connected to the fluid passage 38 that communicates with the regulator 33, and an accumulator passage 63 connected to the fluid passage 39 that communicates with the accumulator 35, are connected to the primary passage 45. More specifically, the master-cylinder passage 61 is connected to the second passage 45b of the primary passage 45. The regulator passage 62 and the accumulator passage 63 are connected to the first passage 45a of the primary passage 45. The pressure-reducing passage 55 is connected to the reservoir 34 of the hydraulic pressure generator 30.

The master-cylinder passage 61 has a master-cylinder pressure cut-off valve 64 therein. The master-cylinder pressure cut-off valve 64 has a spring and a solenoid that is switched on and off, and is a normally-open electromagnetically-controlled valve. The regulator passage 62 has a regulator pressure cut-off valve 65 therein. The regulator pressure cut-off valve 65 has a spring and a solenoid that is switched on and off, and is a normally-open electromagnetically-controlled valve. The accumulator passage 63 has a pressure boost linear control valve 66 therein. The accumulator passage 63 and the first passage 45a of the primary passage 45 are connected to the pressure-reducing passage 55 with a pressure-reducing linear control valve 67 interposed therebetween.

Each of the pressure boost linear control valve 66 and the pressure-reducing linear control valve 67 has a spring and a linear solenoid, and is a normally-closed electromagnetically-controlled valve. The pressure difference between inlet and outlet ports of the pressure boost linear control valve 66 corresponds to the difference between the pressure of the brake oil in the accumulator 35 and the pressure of the brake oil in the primary passage 45. The pressure difference between inlet and outlet ports of the pressure-reducing linear control valve 67 corresponds to the difference between the pressure of the brake oil in the primary passage 45 and the pressure of the brake oil in the pressure-reducing passage 55. Assume that the electromagnetic driving force corresponding to the electric power that is supplied to the linear solenoids of the pressure boost linear control valve 66 and the pressure-reducing linear control valve 67 is F1; that the urging force of the springs is F2; and that the pressure-difference-exerted force corresponding to the pressure difference between inlet and outlet ports of the pressure boost linear control valve 66 and the pressure-reducing linear control valve 67 is F3. The forces, F1, F2 and F3, satisfies the equation, F1+F3=F2. Thus, it is possible to control the pressure difference between inlet and outlet ports of the pressure boost-linear control valve 66 and the pressure-reducing linear control valve 67 by continuously controlling the electric power that is supplied to the linear solenoids of the pressure boost linear control valve 66 and the pressure-reducing linear control valve 67.

The pressure boost linear control valve 66 is a normally-closed electromagnetically-controlled valve as mentioned above. Thus, when the pressure boost linear control valve 66 is not energized, the primary passage 45 is cut off from the accumulator 35 as a high-pressure hydraulic pressure source. The pressure-reducing linear control valve 67 is also a normally-closed electromagnetically-controlled valve as mentioned above. Thus, when the pressure-reducing linear control valve 67 is not energized, the primary passage 45 is cut off from the reservoir 34. It can be said that the primary passage 45 is also connected to the reservoir 34 as a low pressure source via the pressure-reducing linear control valve 67.

A stroke simulator 69 is, upstream of the master-cylinder pressure cut-off valve 64, connected to the master-cylinder passage 61 with a stroke simulator-separating valve 68 interposed therebetween. The stroke simulator-separating valve 68 has a spring and a solenoid that is switched on and off, and is a normally-closed electromagnetically-controlled valve. The stroke simulator 69 includes a plurality of pistons and a plurality of springs. When the stroke simulator-separating valve 68 is open, the stroke simulator 69 creates the reaction force corresponding to the depression force applied to the brake pedal 24 by a driver. It is preferable that, as the stroke simulator 69, one that has multistage spring characteristics be used, in order to improve the braking feeling. The stroke simulator 69 of this embodiment has four-level spring characteristics.

A brake ECU 70 controls the hydraulic pressure generator 30 and the hydraulic actuator 40 that are constructed as described above. The brake ECU 70 is a microprocessor including a CPU. The brake ECU 70 includes a ROM for storing various programs, a RAM for temporarily storing data, an I/O port, a communication port, etc, in addition to the CPU. The brake ECU 70 communicates with the hybrid ECU 7. The brake ECU 70 controls the pump 36 of the hydraulic pressure generator 30, and the electromagnetically-controlled valves 51 to 54, 56 to 59, 60, and 64 to 68, which constitute the hydraulic actuator 40, based on the control signal from the hybrid ECU 7, and the signals from the various sensors.

As shown in FIG. 1, the sensors connected to the brake ECU 70 include a regulator pressure sensor 71, an accumulator pressure sensor 72, and a control pressure sensor 73. The regulator pressure sensor 71 detects the pressure (regulator pressure) of the brake oil in the regulator passage 62, upstream of the regulator pressure cut-off valve 65, and supplies the signal indicating the detected value to the brake ECU 70. The accumulator pressure sensor 72 detects the pressure (accumulator pressure) of the brake oil in the accumulator passage 63, downstream of the pressure boost linear control valve 66, and supplies the signal indicating the detected value to the brake ECU 70. The control pressure sensor 73 detects the pressure of the brake oil in the second passage 45b of the primary passage 45, and supplies the signal indicating the detected value to the brake ECU 70. The values detected by the sensors 71 to 73 are sequentially input to the brake ECU 70 at predetermined intervals, and stored in a predetermined storage region (buffer) of the brake ECU 70 by a predetermined amount each time.

When the communication valve 60 is opened, and the first passage 45a and the second passage 45b of the primary passage 45 therefore communicate with each other, the output value of the control pressure sensor 73 indicates the hydraulic pressure on the low-pressure side of the pressure boost linear control valve 66, and, at the same time, indicates the hydraulic pressure on the high-pressure side of the pressure-reducing linear control valve 67. The output value of the control pressure sensor 73 can be used to control the pressure boost linear control valve 66 and the pressure-reducing linear control valve 67. When the pressure boost linear control valve 66 and the pressure-reducing linear control valve 67 are closed, and the first passage 45a and the second passage 45b of the primary passage 45 are separated from each other because the communication valve 60 is not energized, the output value of the control pressure sensor 73 indicates the master cylinder pressure. When the first passage 45a and the second passage 45b of the primary passage 45 communicate with each other because the communication valve 60 is opened, the pressure-sustaining valves 51 to 54 are opened, and the pressure-reducing valves 56 to 59 are closed, the output value of the control pressure sensor 73 indicates the braking pressure (wheel cylinder pressure) of the disc brake units 21.

The sensors connected to the brake ECU 70 include the above-described brake stroke sensor 25. The brake stroke sensor 25 detects the operation amount of the brake pedal 24, and supplies the signal indicating the detected value to the brake ECU 70. The values detected by the brake stroke sensor 25 are also sequentially input to the brake ECU 70 at predetermined intervals, and stored in a predetermined storage region (buffer) of the brake ECU 70 by a predetermined amount each time. In addition to the brake stroke sensor 25, a pedal depression force sensor for detecting the operational state of the brake pedal 24, and a brake switch for detecting the depression of the brake pedal 24 may be connected to the brake ECU 70.

The above-described hydraulic brake unit 20 uses a single pressure boost linear control valve 66 and a single pressure-reducing linear control valve 67 to control the braking pressure of the disc brake units 21 of the four wheels. The communication valve 60 is disposed between the first passage 45a, which communicate with the wheel cylinders of the rear-wheel disc brake units 21RL and 21RR, and the second passage 45b, which communicate with the wheel cylinders of the front-wheel disc brake units 21FL and 21 FR. Such a construction makes it possible to reduce the number of linear control valves required to realize the pressure increase/reduction control, so that it is possible to reduce the cost of the hydraulic brake unit 20.

When the above-described construction is adopted, however, the brake oil supplied from the accumulator 35, which is a hydraulic pressure source, flows into the first passage 45a first, and then flows into the second passage 45b via the communication valve 60. For this reason, the communication valve 60 serves as a throttle orifice, and a problem arises that the pressure increase in the second passage 45b that is located on the front-wheel side of the communication valve 60 is delayed relative to the pressure increase in the first passage 45a on the rear-wheel side. This problem becomes serious especially when the brake pedal is suddenly depressed at the time of sudden braking, which results in a steep gradient of the pressure increase. In addition, because the flow rate through the single pressure-reducing linear control valve 66 has an upper limit, there is a possibility that, when a desired hydraulic pressure value at a certain level or above is set at the time of sudden braking, it is impossible to allow the brake oil to flow through the first and second passages 45a and 45b at a desired flow rate, which causes response delay.

Figure 3:
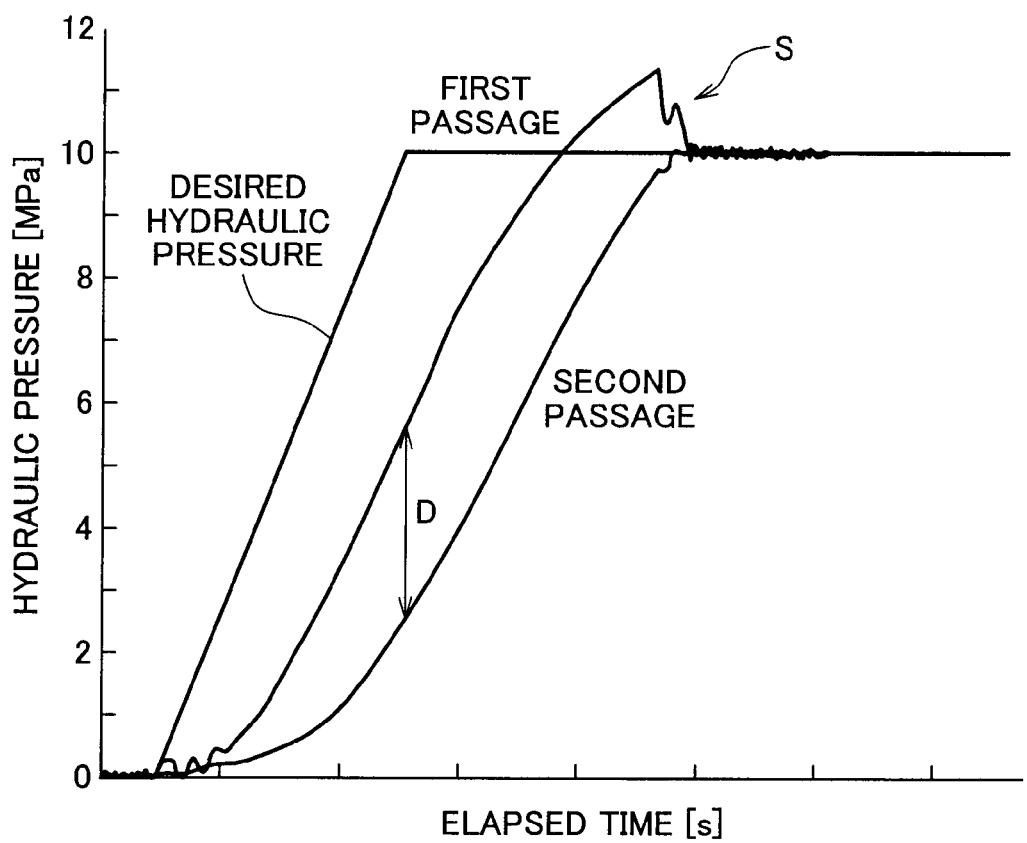
FIG. 3 is a graph showing a transition of the hydraulic pressure in first and second passages in the hydraulic brake unit.

FIG. 3 is a graph showing the transition of the hydraulic pressure in the first and second passages 45a and 45b in relation to the desired hydraulic pressure value set according to a request for braking in the hydraulic brake unit 20. As shown in FIG. 3, the response of the hydraulic pressure in the second passage 45b that is located further from the pressure boost linear control valve 66 than the first passage 45a is delayed relative to that in the first passage 45a that is located nearer to the pressure boost linear control valve 66. "D" in FIG. 3 indicates the length of the response delay. Such response delay causes the difference in the braking force that is applied to the wheels between the rear wheels that are associated with the disc brake units 21RL and 21RR that communicate with the first passage 45a, and the front wheels that are associated with the disc brake units 21FL and 21FR that communicate with the second passage 45b, until the response delay is eliminated. This is not preferable from the viewpoint of the vehicle stability at the time of braking.

Whether the wheel cylinder pressure in all of the disc brake units 21 has reached to the desired hydraulic pressure is determined from the output value of the control pressure sensor 73. In the hydraulic actuator 40 having the construction described above, the brake oil is supplied to the second passage 45b from the pressure boost linear control valve 66 to the second passage 45b via the first passage 45a until the hydraulic pressure in the second passage 45b, that is, the output value of the control pressure sensor 73 reaches the desired hydraulic pressure value. For this reason, in the first passage 45a, the overshoot in which the hydraulic pressure exceeds the desired hydraulic pressure is caused as indicated by "S" in FIG. 3. Such an overshoot prevents the hydraulic pressure in the first and second passages 45a and 45b from being equalized quickly.

In consideration of such circumstances, this embodiment provides a method of controlling the hydraulic actuator 40 that can solve the problem described above.

Figure 4:
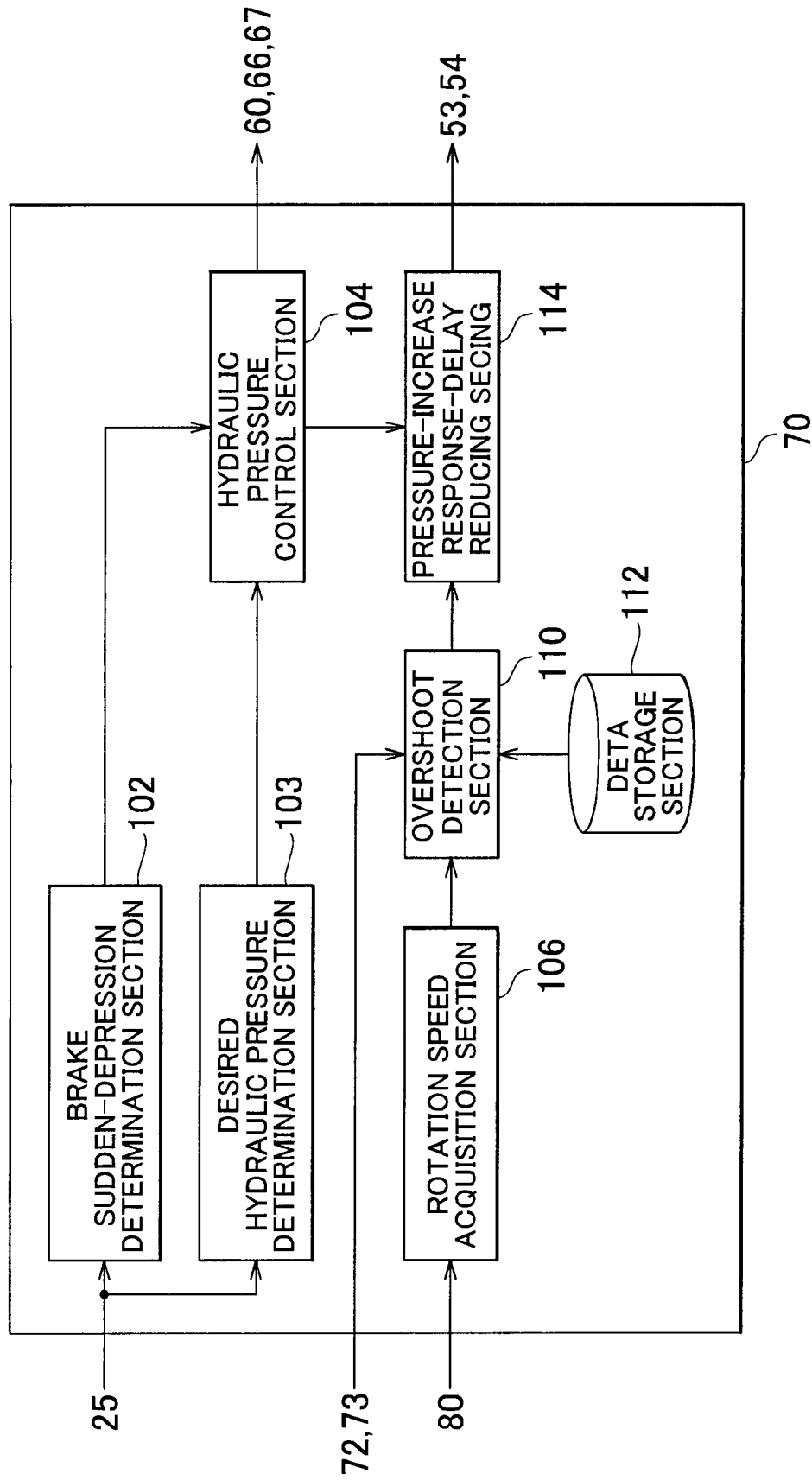
FIG. 4 is a functional block diagram showing a configuration of the part of the brake ECU that is involved in hydraulic fluid inflow-limiting control according to the first embodiment.

FIG. 4 is a functional block diagram showing a configuration of the part of the brake ECU 70 that is involved in the pressure-increase response-delay reducing control according to this embodiment. Each block shown in FIG. 4 can be realized by elements, such as a CPU and a memory of a computer, and electric circuits when using hardware means. Each block can also be realized by a computer program or the like, when using software means. However, each block is herein described as a functional block that is realized by the combination of hardware and software. Those skilled in the art will understand that these functional blocks can be realized in various ways by utilizing the combination of hardware and software.

A brake sudden-depression determination section 102 determines whether the brake pedal 24 has been suddenly depressed, based on the operation amount detected by the brake stroke sensor 25. When the brake pedal 24 is suddenly depressed, it is determined that sudden braking is requested, and the information to this effect is provided to a hydraulic pressure control section 104.

A desired hydraulic pressure determination section 103 determines the desired hydraulic pressure required to produce the braking force according to the operation amount detected by the brake stroke sensor 25, and passes the desired hydraulic pressure value to the hydraulic pressure control section 104.

The hydraulic pressure control section 104 opens the communication valve 60, and controls the pressure boost linear control valve 66 according to the desired hydraulic pressure value. When the control valves operate in accordance with the control, the brake oil is supplied to the wheel cylinders of the disc brake units 21 of the respective wheels via the first and second passages 45a and 45b, and applies braking force to the wheels.

When the brake sudden-depression determination section 102 determines that sudden braking is requested, the hydraulic pressure control section 104 fully opens the pressure boost linear control valve 66 instead of linearly controlling this valve according to the desired hydraulic pressure value. When the desired hydraulic pressure value is 50 MPa/s or above, for example, the brake sudden-depression determination section 102 determines that sudden braking is requested. The maximum amount of hydraulic fluid is sent to the first and second passages 45a and 45b to enhance the pressure increase response in the second passage 45b.

It is also preferable that, when the brake sudden-depression determination section 102 determines that sudden braking is requested, and it is expected that the flow rate of brake oil falls short even if the pressure boost linear control valve 66 is fully opened, the hydraulic pressure control section 104 perform the control, in which the regulator pressure cut-off valve 65 is opened to supply the regulator pressure to the first and second passages 45a and 45b. It is also preferable that, when it is expected that the flow rate of brake oil falls short even if the above control is performed, the hydraulic pressure control section 104 open the master-cylinder pressure cut-off valve 64. In this way, the brake oil highly pressurized by the depression force exerted on the brake pedal is directly supplied from the master cylinder 32 to the second passage 45b via the master-cylinder passage 61, so that it is possible to enhance the pressure increase response in the second passage 45b. The hydraulic pressure control section 104 does not have to perform the above-described control to increase the flow rate of brake fluid.

A pressure-increase response-delay reducing section 114 controls the pressure-sustaining valves 53 and 54 to reduce the response delay D of the pressure increase in the second passage 45b relative to the pressure increase in the first passage 45a at the time of sudden braking. Specifically, when the brake sudden-depression determination section 102 determines that sudden braking is requested after the control of hydraulic pressure is started, the pressure-increase response-delay reducing section 114 closes the pressure-sustaining valves 53 and 54, which communicate with the first passage 45a, for a predetermined period of time, and then opens the pressure-sustaining valves 53 and 54. The predetermined period of time may be two control cycles (10 ms) of the brake ECU 70, for example. In this way, during the above-described predetermined period, because the pressure-sustaining valves 53 and 54 are closed, the brake oil that flows from the accumulator 35 into the first passage 45a via the pressure boost linear control valve 66 does not flows into the wheel cylinders of the disc brake units 21RL and 21RR, but instead flows into the second passage 45b via the communication valve 60. As a result, the wheel cylinders of the front disc brake units 21FL and 21FR, which communicate with the second passage 45b, are supplied with brake oil before the wheel cylinders of the rear disc brake units 21RL and 21RR, which communicate with the first passage 45a. Accordingly, the pressure in the second passage 45b increases before the pressure in the first passage 45a increases. Thus, the response delay in the pressure increase in the second passage 45b relative to the pressure increase in the first passage 45a is reduced. As a result, the difference in the braking force applied to the wheels by the disc brake units between the rear wheels and the front wheels becomes small, so that it is possible to enhance the vehicle stability at the time of sudden braking.

With regard to another embodiment, when the brake sudden-depression determination section 102 determines that sudden braking is requested after the control of hydraulic pressure is started, the pressure-increase response-delay reducing section 114 may perform the duty cycle control of the pressure-sustaining valves 53 and 54, which communicate with the first passage 45a, for a predetermined period of time. The predetermined period of time may be two control cycles (10 ms) of the brake ECU 70, for example. Assume that the diameter of the orifice of the pressure-sustaining valves 53 and 54 is f. By performing the duty cycle control in which the valve closed period is t1 during which the solenoids of the pressure-sustaining valves 53 and 54 are energized and closed, and the valve open period is t2, it is possible to obtain the apparent diameter of the orifice expressed by f*t2/(t1+t2). During the predetermined period of time, the apparent opening degree of the pressure-sustaining valves 53 and 54 is less than the normal opening degree for the brake oil that flows from the accumulator 35 into the first passage 45a via the pressure boost linear control valve 66. Accordingly, the amount of the brake oil that is supplied to the wheel cylinders of the disc brake units 21RL and 21RR decreases. The brake oil the amount of which corresponds to the amount of the decrease flows into the second passage 45b via the communication valve 60, and is supplied to the wheel cylinders of the disc brake units 21FL and 21FR. Thus, the amount of the brake oil that is supplied to the second passage 45b is increased by performing the duty cycle control, as compared to the case where the pressure-sustaining valves 53 and 54 are kept open. As a result, it is possible to reduce the response delay in the pressure increase in the second passage 45b relative to the pressure increase in the first passage 45a. Also in the case of this embodiment, the difference in the braking force applied to the wheels by the disc brake units between the rear wheels and the front wheels of the vehicle becomes small, so that it is possible to enhance the vehicle stability at the time of sudden braking.

A rotation speed acquisition section 106 receives information on the rotation speed of the wheels detected by wheel speed sensors 80, which are individually installed near the front wheels and the rear wheels of the vehicle, calculates the wheel speed, and passes the calculation result to an overshoot detection section 110.

The overshoot detection section 110 detects whether the overshoot beyond the desired hydraulic pressure in the first passage 45a is occurring, by one of the first to third methods described below, using the information provided by various sensors.

The first method of detecting the overshoot uses the data on hydraulic pressure that is prepared in advance. The detected values output from the accumulator pressure sensor 72 and the control pressure sensor 73 are also input to the overshoot detection section 110. A data storage section 112 stores typical waveform data of the detected values that is output from the accumulator pressure sensor 72 and the control pressure sensor 73 when the overshoot occurs in the first passage 45a. The overshoot detection section 110 compares the waveform data stored in the data storage section 112 and the detected values output from the accumulator pressure sensor 72 and the control pressure sensor 73, which the overshoot detection section 110 has actually received, and, if the extent to which the waveform data and the values coincide with each other is equal to or greater than a predetermined extent, it is determined that the overshoot has occurred in the first passage 45a.

The second method of detecting the overshoot uses the information on the wheel speed of the front wheels and the rear wheels. The overshoot occurs in the first passage 45a only at the time of sudden braking. At the time of such sudden braking, the rear wheels associated with the disc brake units 21RL and 21RR lock. Hence, when the rear wheels lock, it is assumed that the overshoot has occurred in the first passage 45a. Specifically, when the difference between the wheel speed of the front wheels and the wheel speed of the rear wheels becomes equal to or greater than a predetermined threshold value, the overshoot detection section 110 determines that the rear wheels have locked, and thus determines that the overshoot in the first passage 45a has been detected.

The third method of detecting the overshoot uses the sudden change in the wheel speed of the rear wheels. When the wheel speed of the rear wheel is Vw, and the braking torque is F; the wheel speed in normal driving conditions (adhesive driving conditions) is calculated by using the following equation:

$$Vw=F/(M+MW)s \qquad (1)$$

where "M" is the moment of inertia of the load applied to the wheel, "MW" is the moment of inertia of the wheel, and "s" is the Laplace operator.

The speed of the wheels at the time the wheels lock is calculated by using the following equation:

$$Vw=F/(MW\cdot s) \qquad (2)$$

When the rear wheels lock, the wheel speed is suddenly changed because the equation determining the wheel speed is changed from the equation (1) to the equation (2). Accordingly, when the amount of change in the wheel speed of the rear wheels is compared with a predetermined threshold value, and it is found that the amount of change is equal to or greater than the threshold value, it is possible to determine that the rear wheels have locked.

As described above, the overshoot occurs in the first passage 45a only at the time of sudden braking that causes the rear wheels to lock. Hence, from the fact that the rear wheel have locked, which is detected based on the sudden change in the wheel speed, the overshoot detection section 110 determines that the overshoot has occurred in the first passage 45a.

When the overshoot detection section 110 detects the overshoot in the first passage 45a, the pressure-increase response-delay reducing section 114 closes the pressure-sustaining valves 53 and 54 for a predetermined period of time. The predetermined period of time may be two control cycles of the brake ECU 70, for example. In this way, during the above-described predetermined period of time, because the pressure-sustaining valves 53 and 54 are closed, the brake oil that flows from the accumulator 35 into the first passage 45a via the pressure boost linear control valve 66 flows into the second passage 45b via the communication valve 60. As a result, the amount of overshoot of the hydraulic pressure in the first passage 45a is reduced. The valve closed period of the pressure-sustaining valves 53 and 54 may be predetermined, or may be increased or decreased according to the estimated amount of overshoot. In another embodiment, it is also preferable that, when the overshoot detection section 110 detects the overshoot in the first passage 45a, the pressure-increase response-delay reducing section 114 performs the duty cycle control of the pressure-sustaining valves 53 and 54.

Figure 5:
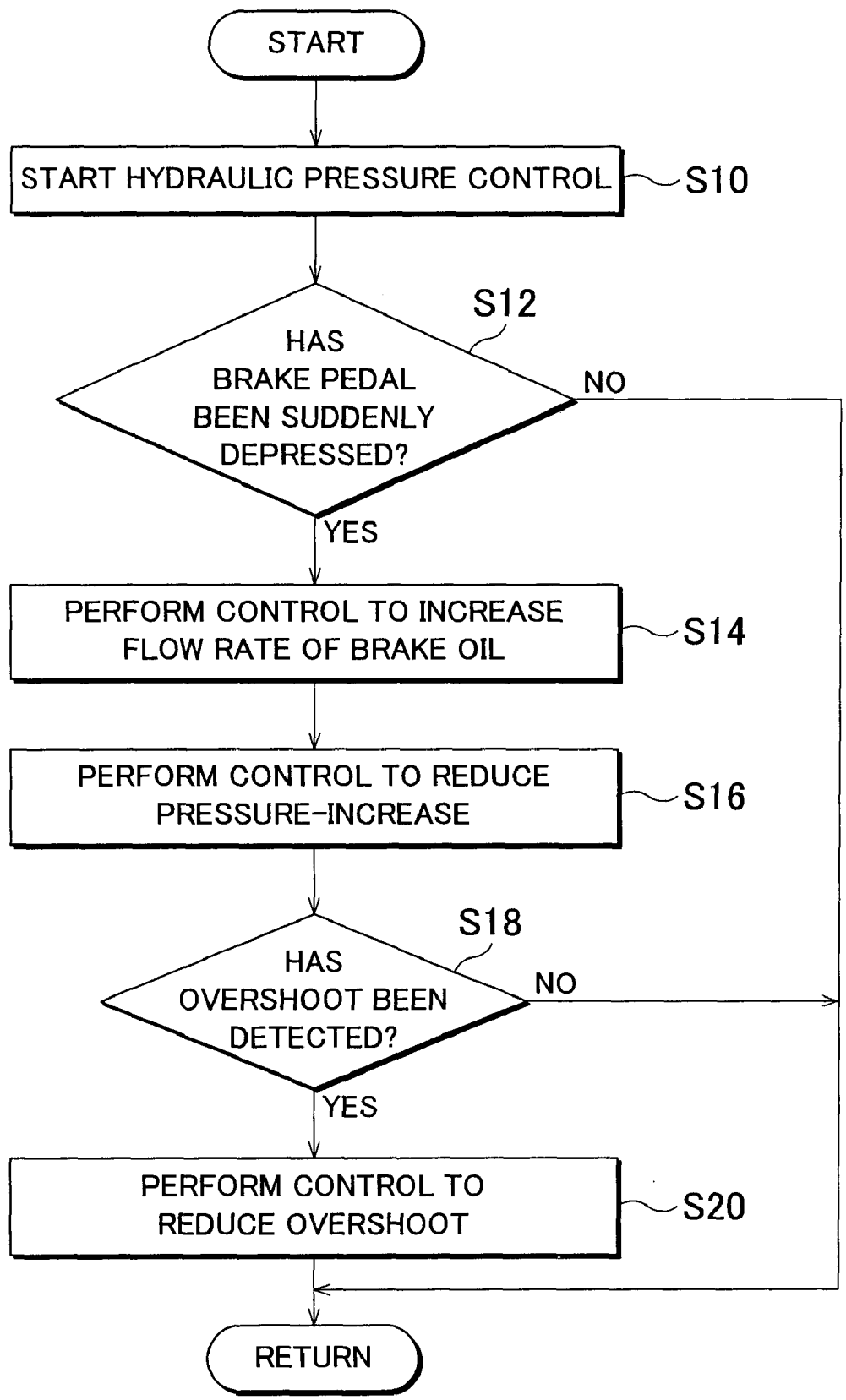
FIG. 5 is a flow chart that explains the control of a hydraulic actuator according to the first embodiment performed at the time of sudden braking.

FIG. 5 is a flow chart for explaining the control of the hydraulic actuator 40 according to the first embodiment performed at the time of sudden braking. Once the hydraulic pressure control of the actuator according to the operation of the brake pedal is started (S10), the brake sudden-depression determination section 102 determines whether the brake pedal 24 has been suddenly depressed (S12). If it is determined that the sudden depression has been made (YES in step S12), the hydraulic pressure control section 104 performs the control to increase the flow rate of brake oil (S14). Specifically, in the control, the pressure boost linear control valve 66 is fully opened, and the regulator pressure cut-off valve 65 and the master-cylinder pressure cut-off valve 64 are opened. Subsequently, the pressure-increase response-delay reduction section 114 performs the control to reduce the response delay in the pressure increase in the second passage 45b relative to the pressure increase in the first passage 45a (S16). The overshoot detection section 110 detects whether the overshoot of the rear wheels is occurring (S18), and, if the overshoot is detected (YES in step S18), the pressure-increase response-delay reduction section 114 performs the overshoot reduction control (S20).

As described above, according to the first embodiment, in the hydraulic brake unit that controls the brake pressure in the four disc brake units 21, using the single pressure boost linear control valve 66 and the single pressure-reducing linear control valve 67, the pressure-sustaining valves 53 and 54 that communicate with the first passage 45a are closed or the duty cycle control of these valves is performed, for the predetermined period of time during sudden braking. As a result, the inflow of brake oil into the wheel cylinders of the disc brake units 21RL and 21RR that communicate with the first passage 45a is temporarily limited, and the corresponding amount of brake oil flows into the second passage 45b. Thus, it is possible to reduce the response delay in the pressure increase in the second passage 45b in which pressure is relatively difficult to increase because the second passage 45b is located relatively distant from the accumulator, which is the hydraulic pressure source. Also in the case where the overshoot of the pressure in the first passage 45a is detected at the time of sudden braking, the pressure-sustaining valves 53 and 54 that communicate with the first passage 45a are closed or the duty cycle control of these valves is performed. In this way, it is possible to reduce the overshoot of the pressure in the first passage 45a in which pressure is relatively easy to increase because the first passage 45a is located relatively near to the accumulator, which is the hydraulic pressure source.

In general, it is necessary to increase the pressure in the second passage 45b communicating with the wheel cylinders of the front-wheel disc brake units 21FL and 21FR at an early stage in the sudden braking of a vehicle. This is because, when the braking force applied to the front wheels is less than that applied to the rear wheels, there is a possibility that the vehicle stability during sudden braking decreases. According to the first embodiment, the difference between the braking force applied to the rear wheels and the braking force applied to the front wheels is decreased by reducing the response delay in the pressure increase in the second passage 45b relative to the pressure increase in the first passage 45a. As a result, it is possible to enhance the vehicle stability during sudden braking.

A second embodiment of the present invention will be described. In the description of the first embodiment, the reduction in the response delay at the time of performing pressure increase control of the brake has been described. However, in the hydraulic brake unit 20 described in relation to FIG. 2, also in the case of pressure reduction control, the brake oil discharged from the disc brake units 21FR and 21FL that communicate with the second passage 45b flows into the first passage 45a via the communication valve 60 opened. Accordingly, especially when the pressure in the wheel cylinders is rapidly reduced, the response delay in the pressure reduction in the second passage 45b occurs. Specifically, there arises a situation where the pressure in the wheel cylinders located on the first passage 45b side (front-wheel side) is higher than the pressure in the wheel cylinders located on the second passage 45a side (rear-wheel side). Because such a situation may affect the driving stability of the vehicle, it is preferable that the pressure reduction response in the passages for the rear wheels and the pressure reduction response in the passages for the front wheels be close to each other. In the description of the second embodiment, a method of reducing the pressure reduction response delay at the time of performing pressure reduction control of the brake will be described.

The second embodiment is similar to the first embodiment in using the vehicle brake system and the hydraulic brake unit shown in FIGS. 1 and 2. The first and second embodiments are different from each other only in the control performed by the brake ECU. Accordingly, the description of the vehicle brake unit and the hydraulic brake unit will be omitted, and only the configuration of a brake ECU 70' according to the second embodiment will be described.

Figure 6:
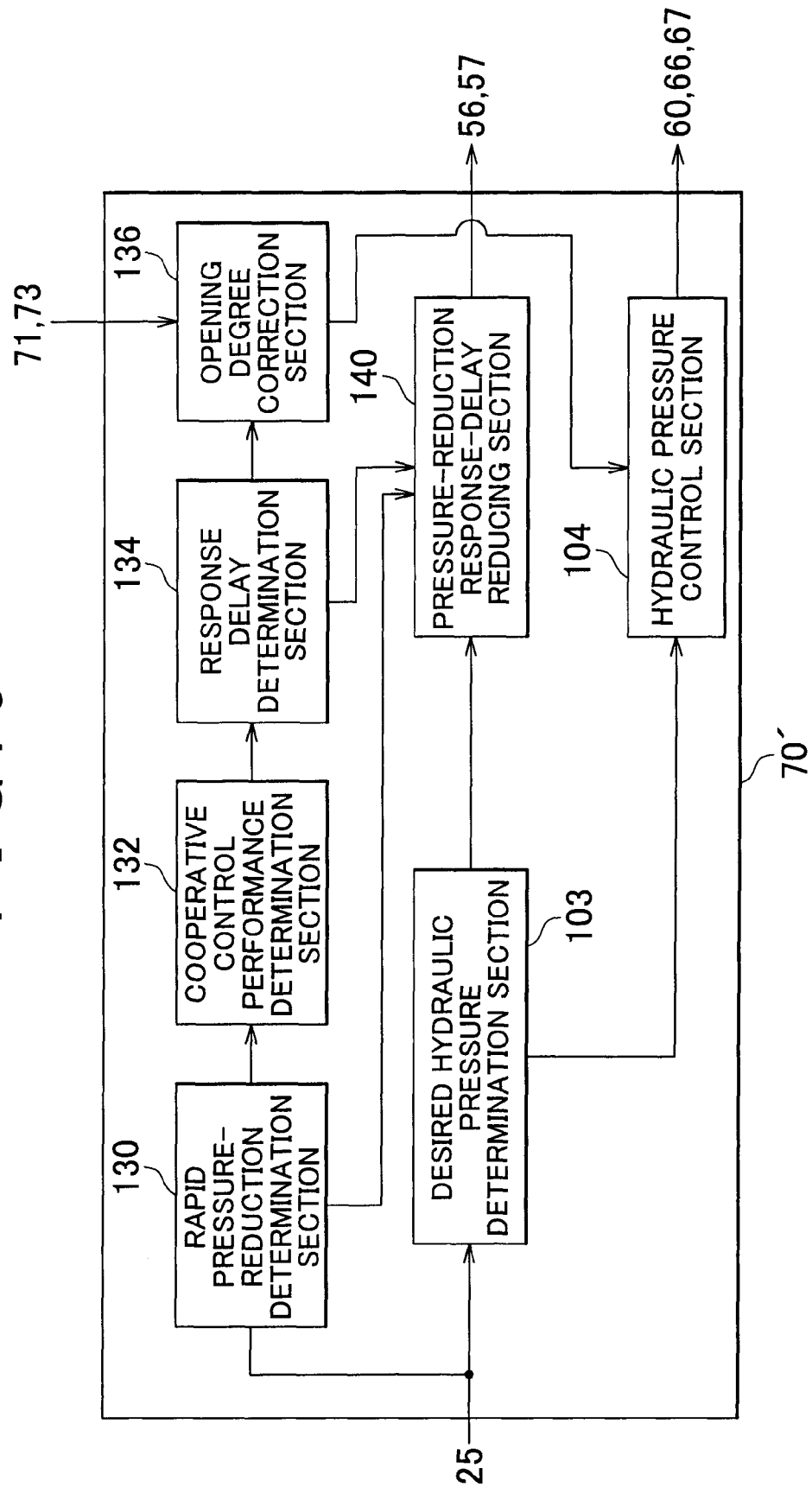
FIG. 6 is a functional block diagram of a brake ECU 70' that shows a configuration of the part of the brake ECU 70' involved in the hydraulic pressure response delay reduction control performed when pressure is reduced.

FIG. 6 is a functional block diagram of the brake ECU 70', which shows a configuration of the part of the brake ECU 70' that is involved in the hydraulic pressure response delay reduction control performed when the pressure is reduced. Those skilled in the art will understand that these functional blocks can also be realized in various ways by utilizing the combination of hardware and software.

A desired hydraulic pressure determination section 103, as in the case of that described with reference to FIG. 4, determines the desired hydraulic pressure required to produce the braking force according to the operation amount of the brake pedal 24 detected by the brake stroke sensor 25, and passes the desired hydraulic pressure value to a hydraulic pressure control section 104. The situation where the hybrid ECU 7 performs cooperative regeneration control between the braking force of the hydraulic brake unit and the braking force of the regenerative braking unit will be described. In this case, the hybrid ECU 7 determines the braking force that the hydraulic brake unit should apply, based on the operation amount of the brake pedal 24. The desired hydraulic pressure determination section 103 determines the desired hydraulic pressure required to produce the braking force that the hydraulic brake unit should apply. Because the cooperative control of the hydraulic braking force and the regenerative braking force is conventionally understood, further detailed description will be omitted.

The hydraulic pressure control section 104 opens the communication valve 60, and controls the opening degree of the pressure-reducing linear control valve 67 according to the desired hydraulic pressure. The brake oil is accordingly discharged from the wheel cylinders of the disc brake units 21 of the respective wheels via the first and second passages 45a and 45b, which causes deceleration of the vehicle to decrease. The hydraulic pressure control section 104 controls the opening degree of the pressure-reducing linear control valve 67, treating the pressure in the second passage 45b detected by the control pressure sensor 73 as wheel cylinder pressure Pwc. Specifically, when Pwc is relatively high as compared to the desired hydraulic pressure, the opening degree of the pressure-reducing linear control valve 67 is increased, and the opening degree of the pressure-reducing linear control valve 67 is decreased as Pwc approaches the desired hydraulic pressure. For this reason, the wheel cylinder pressure Pwc may be considered as the opening degree command value of the pressure-reducing linear control valve 67.

A rapid pressure-reduction determination section 130 determines whether the wheel cylinder pressure is going to be rapidly reduced, based on the operation amount detected by the brake stroke sensor 25. When it is determined that the pressure is going to be rapidly reduced, the information to this effect is provided to a pressure-reduction response-delay reducing section 140.

A cooperative control performance determination section 132 determines whether the hybrid ECU 7 is performing the cooperative control of the braking force of the hydraulic brake unit and the braking force of the regenerative braking unit. The method of correcting the opening degree, which is described later, differs depending on whether the cooperative control is being performed. This will be described with reference to FIG. 7.

A response delay determination section 134 estimates the amount of response delay in the pressure reduction in the second passage 45b. When the amount of pressure reduction response delay is equal to or greater than a predetermined threshold value, the response delay determination section 134 instructs the pressure-reduction response-delay reducing section 140 to perform a predetermined control. The threshold value is set to the value with which the response delay in the pressure reduction in the second passage 45b relative to the pressure reduction in the first passage 45a falls within a range that is acceptable from the viewpoint of the vehicle stability. The threshold value may be determined through experiments and/or simulations. The method of estimating the amount of pressure reduction response delay will be described later.

An opening degree correction section 136 corrects the wheel cylinder pressure Pwc that is used to determine the opening degree of the pressure-reducing linear control valve 67 when the pressure-reduction response-delay reducing section 140 performs the control. While the cooperative control is performed, the opening degree correction section 136 corrects the opening degree command value of the pressure-reducing linear control valve 67 by using the wheel cylinder pressure Pwc detected by the control pressure sensor 73, and the period of time during which the pressure-reducing linear control valve 67 is opened. If the cooperative control is not performed, the opening degree correction section 136 uses the value of the master cylinder pressure detected by the regulator pressure sensor 71 as the opening degree command value of the pressure-reducing linear control valve 67. The above procedure will be described in detail later.

When the rapid pressure-reduction determination section 130 determines that the wheel cylinder pressure Pwc is going to be rapidly reduced, and the response delay determination section 134 determines that the difference between the hydraulic pressure in the first passage 45a and the hydraulic pressure in the second passage 45b is large, the pressure-reduction response-delay reducing section 140 opens the valves located on the second passage 45b side, that is, the pressure-reducing valves 56 and 57, for a predetermined period of time. The predetermined period of time may be two control cycles (10 ms) of the brake ECU 70, for example. In this way, the brake oil discharged from the front-side wheel cylinders is discharged into the pressure-reducing passage 55 via the communication valve 60 and the pressure-reducing linear control valve 67, and, in addition, via the pressure-reducing valves 56 and 57. Thus, the reduction in the front-side wheel cylinder pressure is accelerated, and it is possible to reduce the pressure reduction response delay in the second passage 45b. Consequently, the difference between the braking force applied to the front wheels of the vehicle and the braking force applied to the rear wheels thereof by the disc brake units is decreased, it is possible to enhance the vehicle stability.

The correction of the wheel cylinder pressure Pwc, which is an opening degree command value of the pressure-reducing linear control valve 67, will be described below.

(A) First, the case where the cooperative regeneration control is not performed will be described. When the cooperative regeneration control is not performed, if the pressure reduction response delay in the second passage 45b is not caused, the pressure Pwc in the second passage 45b would be controlled to become equal to the master cylinder pressure Pmc by the hydraulic pressure control section 104. Actually, however, when the pressure is rapidly reduced, the pressure reduction response delay in the second passage 45b is caused, which results in Pwc>Pmc. Accordingly, it is possible to indirectly detect the amount of pressure reduction response delay in the second passage 45b by calculating the difference therebetween, Pwc−Pmc.

As described above, the opening degree of the pressure-reducing linear control valve 67 is controlled based on Pwc. However, when the pressure-reducing valves 56 and 57, the value of Pwc, which is detected by the control pressure sensor 73 on the second passage 45b, rapidly decreases into a value significantly different from the value of the master cylinder pressure Pmc. Thus, if the control of the opening degree of the pressure-reducing linear control valve 67 using Pwc is performed, the system cannot follow the operation amount of the brake pedal. Specifically, the opening degree of the pressure-reducing linear control valve 67 that is controlled based on Pwc decreases with the decrease in Pwc, which impedes the increase in the pressure reduction response caused by opening the pressure-reducing valves 56 and 57.

In such a case, the opening degree correction section 136 instructs the hydraulic pressure control section 104 to use the master cylinder pressure Pmc that is detected by the regulator pressure sensor 71, instead of Pwc, as the opening degree command value. Because the regulator pressure sensor 71 is separated from the first and second passages 45a and 45b by the regulator pressure cut-off valve 65 and the master-cylinder pressure cut-off valve 64, the regulator pressure sensor 71 is not affected by the pressure variation due to opening of the pressure-reducing valves 56 and 57. As a result, the hydraulic pressure control section 104 can properly control the opening degree of the pressure-reducing linear control valve 67.

(B) Next, the case where the cooperative regeneration control is being performed will be described. While the cooperative regeneration control is performed, the master cylinder pressure Pmc is substantially equal to the pressure corresponding to the vehicle's entire braking-force command value, whereas the braking force that is applied by hydraulic pressure is decreased by the regenerative braking force. For this reason, the pressure Pwc in the second passage 45b is always lower than the master cylinder pressure Pmc (Pwc<Pmc). Accordingly, it is impossible to estimate the amount of the pressure reduction response delay in the second passage 45b by calculating the difference, Pwc−Pmc. The response delay determination section 134 therefore estimates the amount of the pressure reduction response delay in the second passage by using the method described below.

Figure 7:
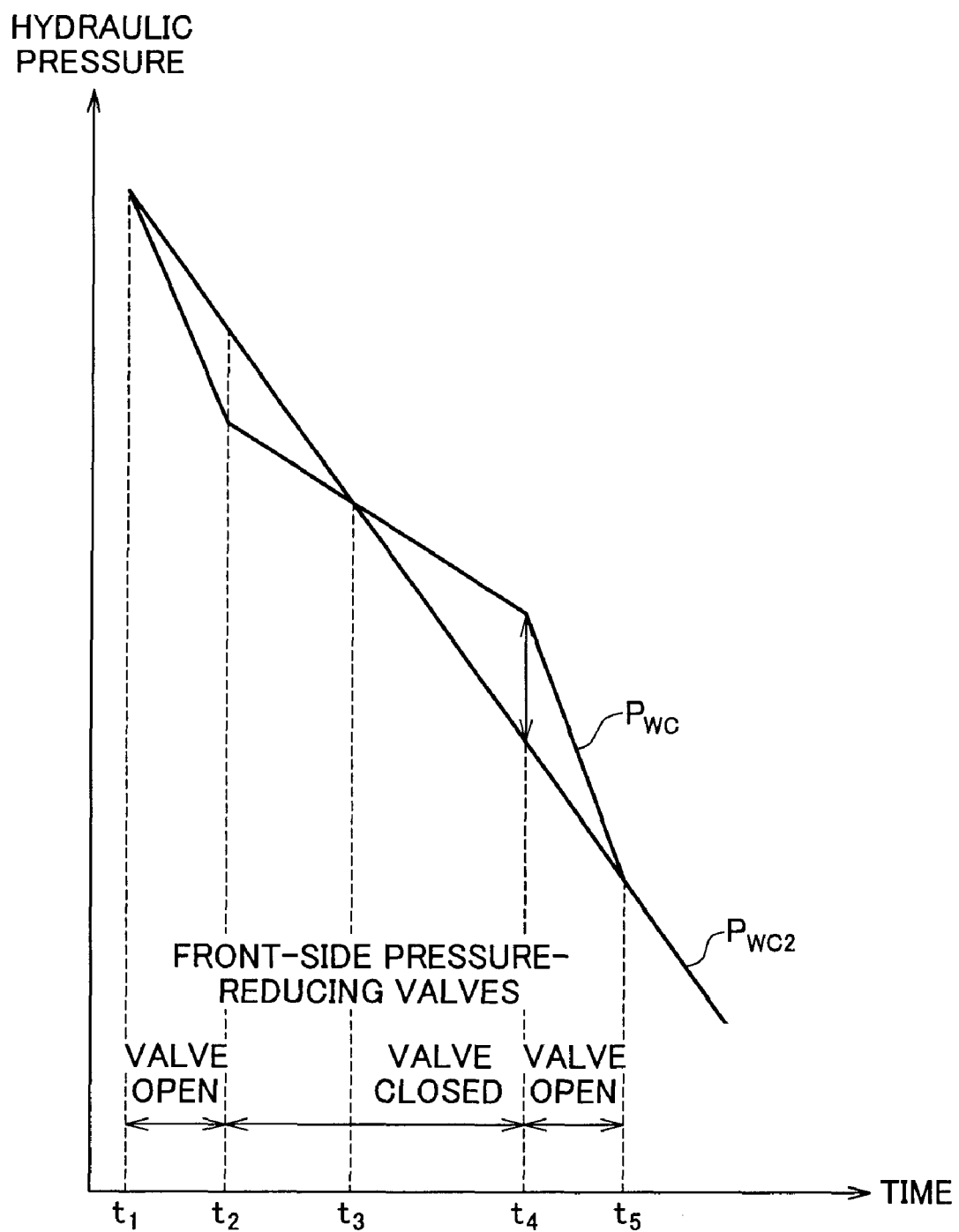
FIG. 7 is a graph that explains an example of the method by which the response delay determination section determines the degree of the pressure reduction response delay in the second passage.

FIG. 7 is a graph for explaining an example of the method by which the response delay determination section 134 determines the degree of the pressure reduction response delay in the second passage 45b. The vertical and horizontal axes of the graph indicate hydraulic pressure and time, respectively. In FIG. 7, Pwc2 shown by a straight line represents the hydraulic pressure that would be detected by the control pressure sensor 73 if the throttle of the communication valve 60 did not exist, and the pressure reduction response delay in the second passage 45b would therefore not occur. On the other hand, Pwc represents the hydraulic pressure that is actually detected by the control pressure sensor 73 when the communication valve 60 exists.

The value of Pwc2 is calculated by the following equation:

$$Pwc2 = Pwc0 - K2 \cdot It \quad (3)$$

where Pwc0 is the wheel cylinder pressure detected when the pressure-reducing valves 56 and 57 are opened, K2 is a coefficient for calculating the pressure reduction value, and It is an integral value of the electric current used to control the pressure-reducing linear control valve 67. Specifically, Pwc2 is the pressure that would be obtained if the pressure in the second passage were reduced, at a constant gradient, from the initial value Pwc0 measured when the rapid pressure reduction is initiated. Pwc2 may be determined by searching a map that is prepared in advance.

If it is determined that the pressure is going to be rapidly reduced at time t1, the pressure-reduction response-delay reducing section 140 opens the pressure-reducing valves 56 and 57, and this state is maintained until time t2. The pressure Pwc is accordingly reduced faster than Pwc2 from t1 to t2. After a predetermined period of time has elapsed, the pressure-reducing valves 56 and 57 are closed. As a result, the speed at which the pressure Pwc is reduced decreases, and the pressure Pwc becomes higher than the pressure Pwc2 before long (t3). In FIG. 7, a higher pressure Pwc than the pressure Pwc2 indicates that the pressure reduction response delay in the second passage 45b is occurring. When the difference between the values on the respective lines, Pwc2−Pwc, becomes equal to or greater than a predetermined threshold value (t4), the response delay determination section 134 determines that the pressure reduction response delay in the second passage 45b has exceeded the allowable range. The pressure-reduction response-delay reducing section 140 again opens the pressure-reducing valves 56 and 57 for a predetermined period of time (t4 to t5) to accelerate the pressure reduction in the second passage 45b. In this way, the pressure-reduction response-delay reducing section 140 determines the opening timing of the pressure-reducing valves 56 and 57.

Even while the cooperative regeneration control is performed, if the pressure-reducing valves 56 and 57, the value of the pressure Pwc detected by the control pressure sensor 73 on the second passage 45b rapidly decreases. For this reason, if the control of the opening degree of the pressure-reducing linear control valve 67 using Pwc is performed, the opening degree of the pressure-reducing linear control valve 67 decreases, which cancels the increase in the pressure reduction response caused by opening the pressure-reducing valves 56 and 57. For this reason, the opening degree correction section 136 uses Pwc1 that is calculated by using the following equation, instead of Pwc, as the opening degree command value of the pressure-reducing linear control valve 67:

$$Pwc1 = Pwc + K1 \cdot Pwc0 \cdot t \quad (4)$$

In this equation, K1 is a correction coefficient, Pwc0 is the wheel cylinder pressure detected when the pressure-reducing valves 56 and 57 are opened, and t is the period of time during which the pressure-reducing valves 56 and 57 are opened. Specifically, the second term on the right hand side of the above equation is the amount by which the pressure in the second passage 45b is additionally reduced due to opening the pressure-reducing valves 56 and 57. The value, Pwc1, which is obtained by adding the value of the above second term to the current value of Pwc is treated as the value that the control pressure sensor 73 should output, and is used as the opening degree command value of the pressure-reducing linear control valve 67. In this way, the opening degree of the pressure-reducing linear control valve 67 is maintained at approximately the same degree as that would be given if the pressure-reducing valves 56 and 57 were closed, and the corresponding hydraulic pressure is released into the pressure-reducing passage 55 via the pressure-reducing linear control valve 67. Accordingly, it is possible to avoid the situation in which, because the pressure Pwc that has been reduced due to opening the pressure-reducing valves 56 and 57 is used to control the pressure-reducing linear control valve 67, the opening degree of the pressure-reducing linear control valve 67 is decreased, and the pressure reduction gradient is therefore decreased.

Figure 8A:
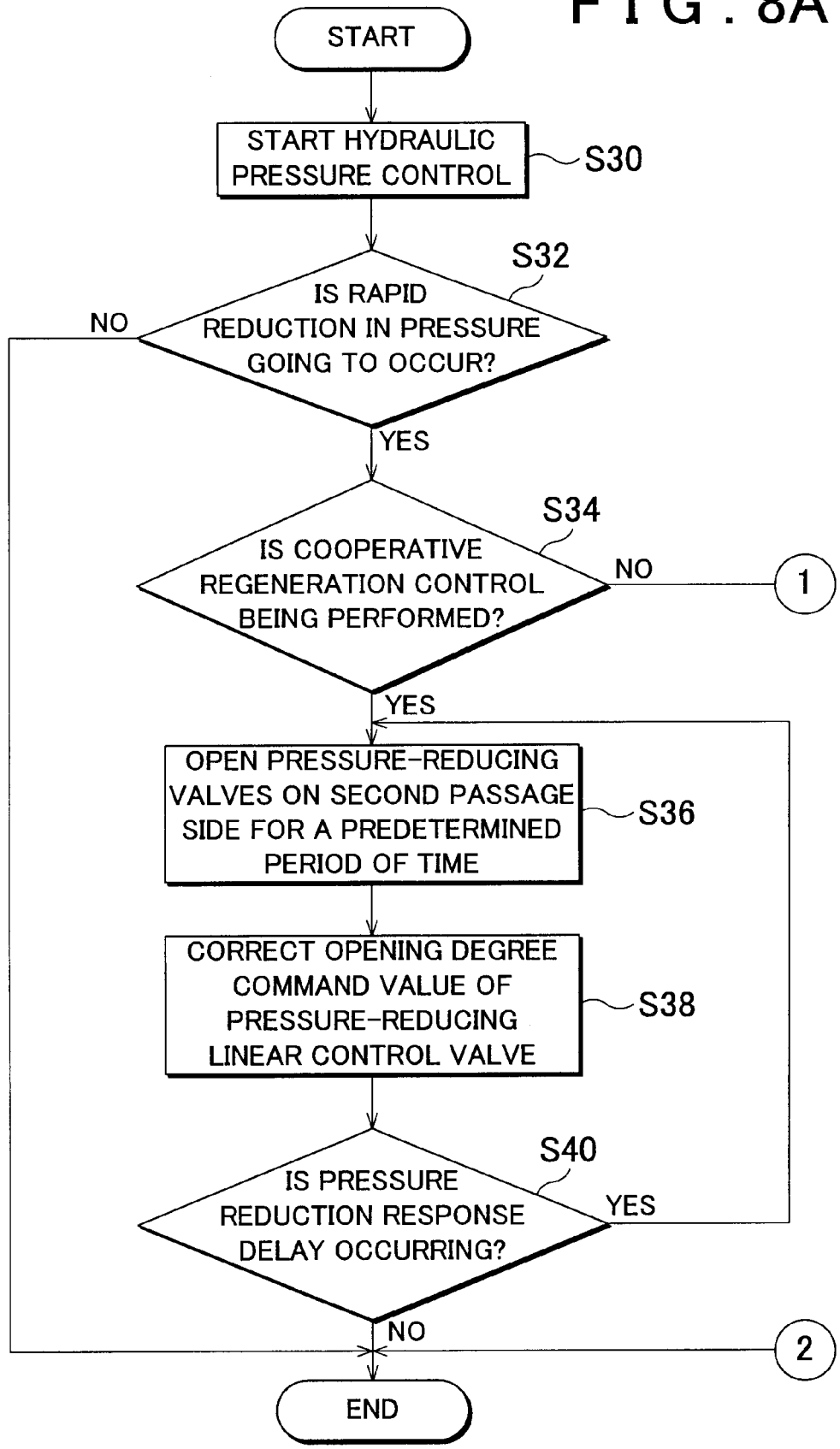
FIGS. 8A and 8B show a flow chart that explains the control of the hydraulic actuator according to the second embodiment, which is performed when the braking pressure is rapidly reduced.
Figure 8B:
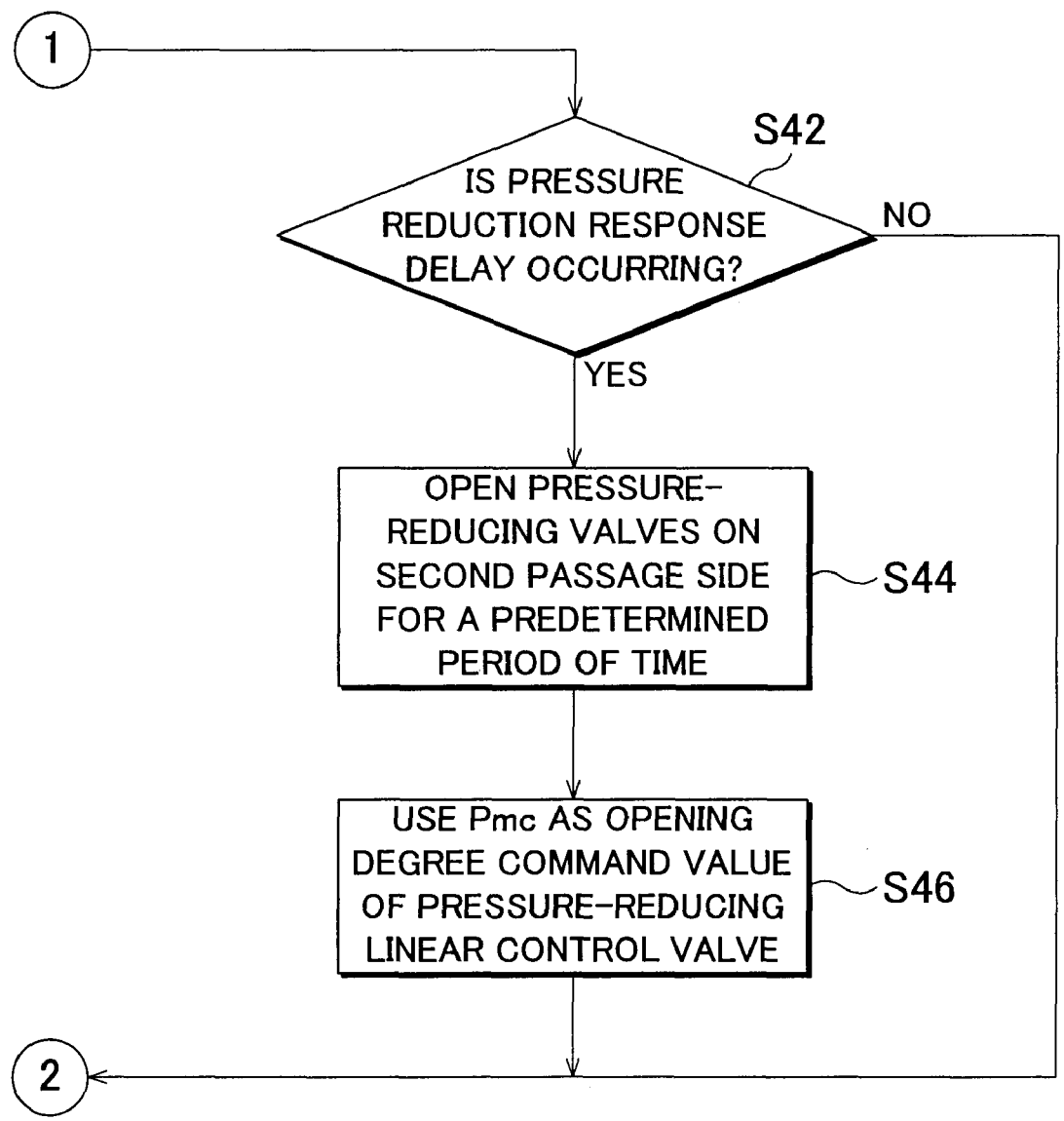

FIGS. 8A and 8B show a flow chart for explaining the control of the hydraulic actuator 40 according to the second embodiment that is performed when the braking pressure is rapidly reduced. Once the hydraulic pressure control section 104 starts pressure reduction control of the wheel cylinder pressure by opening the pressure-reducing linear control valve 67 and the communication valve 60 in response to the operation of the brake pedal (S30), the rapid pressure-reduction determination section 130 determines whether rapid reduction in the wheel cylinder pressure is going to occur (S32). If it is determined that the rapid pressure reduction will not occur (NO in step S32), the process ends. If it is determined that the rapid pressure reduction will occur (YES in step S32), the cooperative control performance determination section 132 sends an inquiry to the hybrid ECU 7 (S34) to determine whether the cooperative regeneration control is being performed.

If it is determined that the cooperative regeneration control is being performed (YES in step S34), the pressure-reduction response-delay reducing section 140 opens the pressure-reducing valves 56 and 57, for a predetermined period of time (S36). The opening degree correction section 136 corrects the opening degree command value of the pressure-reducing linear control valve 67, using the above equation (4) (S38). After the predetermined period of time has elapsed, the pressure-reducing valves 56 and 57 are closed, and the response delay determination section 134 thereafter determines whether the pressure reduction response delay is occurring in the second passage 45b through the procedure described in the above section (B) (S40). If it is determined that the pressure reduction response delay is occurring (YES in step S40), the process returns to step S36, and the pressure-reduction response-delay reducing section 140 again opens the pressure-reducing valves 56 and 57 for a predetermined period of time. If it is determined that the pressure reduction response delay is within an allowable range (NO in step S40), the process ends.

In step S34, if it is determined that the cooperative regeneration control is not being performed (NO in step S34), the response delay determination section 134 determines whether the pressure reduction response delay is occurring in the second passage 45b through the procedure described in the above section (A) (S42). If it is determined that the pressure reduction response delay is within an allowable range (NO in step S42), the process ends. If it is determined that the pressure reduction response delay is occurring (YES in step S42), the pressure-reduction response-delay reducing section 140 opens the pressure-reducing valves 56 and 57 located on the second passage 45b side for a predetermined period of time (S44). The opening degree correction section 136 uses Pmc, instead of Pwc, as the opening degree command value of the pressure-reducing linear control valve 67 (S46).

According to the second embodiment, as described above, by opening the pressure-reducing valves located on the second passage 45b side when the pressure reduction control is performed, the route that leads the hydraulic pressure from the wheel cylinders on the second passage 45b side to the pressure-reducing passage and the route passing through the communication valve and the pressure reduction control valve are opened. In this way, it is possible to increase the pressure reduction gradient in the second passage. Thus, it is possible to reduce the response delay in the pressure reduction in the second passage 45b relative to the pressure reduction in the first passage 45a that is caused by the pressure reduction using the single pressure reduction control valve for the first and second passages that communicate with each other via the communication valve.

In addition, it is possible to inhibit the opening degree of the pressure-reducing linear control valve from decreasing under the influence of the reduction, accompanying the opening of the pressure-reducing valves, in the wheel cylinder pressure Pwc that is detected by the control pressure sensor 73. If the opening degree of the pressure-reducing linear control valve decreases, the pressure reduction gradient in the second passage also decreases, which cancels the effect produced by opening the pressure-reducing valves. However, the above-described correction of the opening-degree command value of the pressure-reducing linear control valve makes it possible to avoid such a situation. While the cooperative regeneration control is not performed, the wheel cylinder pressure Pwc and the master cylinder pressure Pmc measured at the time of starting reducing pressure are equal to each other. By using the master cylinder pressure as the opening degree command value of the pressure reduction control valve, it is possible to inhibit the opening degree of the pressure-reducing linear control valve from decreasing under the influence of the reduction that accompanies the opening of the pressure-reducing valves, in the wheel cylinder pressure Pwc that is detected by the control pressure sensor 73.

In the second embodiment, it is possible to substitute the determination method of step S40 of FIG. 8A, which is performed if the cooperative regeneration control is being performed, for the determination method of step S42 of FIG. 8B, which is performed if the cooperative regeneration control is not being performed.

While the invention has been described with reference to example embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, other combinations and configurations, including more, less or only a single element, are also within the spirit and scope of the invention.

What is claimed is:

1. A vehicle brake system for applying braking force to a plurality of wheels of a vehicle, comprising:
   a wheel cylinder, provided at each wheel, that produces the braking force by using hydraulic pressure;
   a hydraulic pressure source that supplies hydraulic fluid that has been pressurized;
   a hydraulic pressure supply passage that supplies hydraulic pressure from the hydraulic pressure source to the wheel cylinder;
   a pressure increase control valve, which is disposed in the hydraulic pressure supply passage, that supplies hydraulic pressure from the hydraulic pressure source to the wheel cylinder according to operation of a brake pedal;
   a communication valve that is placed in a channel of the hydraulic fluid extending from the pressure increase control valve to the wheel cylinder, and that separates the channel, as needed, into an upstream-side first passage that communicates with at least one wheel cylinder, and a downstream-side second passage that communicates with the wheel cylinder other than the wheel cylinder that communicates with the first passage, wherein the first passage is closer to the pressure increase control valve than the second passage;
   a pressure-reducing passage that discharges the hydraulic fluid from the wheel cylinder;
   a pressure reduction control valve, which is disposed between the pressure-reducing passage and the first passage, that controls the flow of the hydraulic fluid that is discharged from the channel of hydraulic fluid;
   a pressure-sustaining valve, which is disposed in each channel that extends from the first passage to the wheel cylinder and in each channel that extends from the second passage to the wheel cylinder, that controls supply of hydraulic fluid to the wheel cylinder;
   a pressure-reducing valve, placed between the pressure-reducing passage and each wheel cylinder;
   a pressure sensor that detects a hydraulic pressure of the second passage; and
   a response delay reduction section that reduces a response delay in changes in pressure in the second passage relative to changes in pressure in the first passage when the pressure change control of the wheel cylinder is performed by supplying hydraulic pressure using the pressure increase control valve, or by releasing hydraulic pressure using the pressure reduction control valve,
   wherein the response delay reduction section includes
      a pressure-increase response-delay section that temporarily limits inflow of the hydraulic fluid into the wheel cylinder that communicates with the first passage when the pressure increase control valve increases pressure to the channel of hydraulic fluid, and
      a pressure-reduction response-delay reducing section that opens, for a predetermined time, the pressure reducing valve assigned to the wheel cylinder that communicates with the second passage, when the pressure reduction control valve is controlled to reduce pressure in the channel of hydraulic fluid based on the hydraulic pressure of the second passage.

2. A vehicle brake system for applying braking force to a plurality of wheels of a vehicle, comprising:
- a wheel cylinder, provided at each wheel, that produces the braking force by using hydraulic pressure;
- a hydraulic pressure source that supplies hydraulic fluid that has been pressurized;
- a hydraulic pressure supply passage that supplies hydraulic pressure from the hydraulic pressure source to the wheel cylinder;
- a pressure increase control valve, which is disposed in the hydraulic pressure supply passage, that supplies hydraulic pressure from the hydraulic pressure source to the wheel cylinder according to operation of a brake pedal;
- a communication valve that is placed in a channel of the hydraulic fluid extending from the pressure increase control valve to the wheel cylinder, and that separates the channel, as needed, into an upstream-side first passage that communicates with at least one wheel cylinder, and a downstream-side second passage that communicates with the wheel cylinder other than the wheel cylinder that communicates with the first passage, wherein the first passage is closer to the pressure increase control valve than the second passage;
- a pressure-sustaining valve, which is disposed in each channel that extends from the first passage to the wheel cylinder and in each channel that extends from the second passage to the wheel cylinder, that controls supply of hydraulic fluid to the wheel cylinder;
- a pressure-increase response-delay reduction section that temporarily limits inflow of the hydraulic fluid into the wheel cylinder that communicates with the first passage when the pressure increase control valve increases pressure to the channel of hydraulic fluid; and
- an overshoot detection section that detects whether an overshoot beyond a desired hydraulic pressure in the first passage has occurred as a result of the pressure increase control valve and the pressure increase response-delay reduction section,
- wherein, if the overshoot is detected, the pressure-increase response-delay reduction section closes, for a predetermined period of time, the pressure-sustaining valve that communicates with the first passage whereby the hydraulic fluid that flows into the first passage flows into the second passage via the communication valve.

3. The vehicle brake system according to claim 2, wherein the pressure-increase response-delay reduction section closes the pressure-sustaining valve that communicates with the first passage, for a predetermined period of time after the pressure increase control is started.

4. The vehicle brake system according to claim 2, wherein the pressure-increase response-delay reduction section performs, for a predetermined period of time after the pressure increase control is started, the duty cycle control of the pressure-sustaining valve that communicates with the first passage.

5. The vehicle brake system according to claim 2, wherein the overshoot detection section detects the overshoot in the first passage by comparing a predetermined threshold value and a difference between a rotation speed of a front wheel of the vehicle and a rotation speed of a rear wheel of the vehicle.

6. The vehicle brake system according to claim 2, wherein the overshoot detection section detects the overshoot in the first passage by comparing a predetermined threshold value and an amount of change in a rotation speed of a wheel assigned to the wheel cylinder that communicates with the first passage.

7. The vehicle brake system according to claim 2, wherein the overshoot detection section detects the overshoot in the first passage by comparing a predetermined pressure with the pressure in the first passage and the pressure in the second passage.

8. A vehicle brake system for applying braking force to a plurality of wheels of a vehicle, comprising:
- a wheel cylinder, provided at each wheel, that produces the braking force by using hydraulic pressure;
- a hydraulic pressure source that supplies hydraulic fluid that has been pressurized;
- a hydraulic pressure supply passage that supplies hydraulic pressure from the hydraulic pressure source to the wheel cylinder;
- a pressure increase control valve, which is disposed in the hydraulic pressure supply passage, that supplies hydraulic pressure from the hydraulic pressure source to the wheel cylinder according to operation of a brake pedal;
- a communication valve that is placed in a channel of the hydraulic fluid extending from the pressure increase control valve to the wheel cylinder, and that separates the channel, as needed, into an upstream-side first passage that communicates with at least one wheel cylinder, and a downstream-side second passage that communicates with the wheel cylinder other than the wheel cylinder that communicates with the first passage, wherein the first passage is closer to the pressure increase control valve than the second passage;
- a pressure-reducing passage that discharges the hydraulic fluid from the wheel cylinder;
- a pressure reduction control valve, which is disposed between the pressure-reducing passage and the first passage, that controls the flow of the hydraulic fluid that is discharged from the channel of the hydraulic fluid;
- a pressure-reducing valve placed between the pressure-reducing passage and each wheel cylinder;
- a pressure sensor that detects a hydraulic pressure of the second passage; and
- a pressure-reduction response-delay reducing section that opens, for a predetermined period of time, the pressure-reducing valve assigned to the wheel cylinder that communicates with the second passage, when the pressure reduction control valve is controlled to reduce pressure in the channel of hydraulic fluid based on the hydraulic pressure of the second passage.

9. The vehicle brake system according to claim 8, further comprising:
- a response delay determination section that determines whether the pressure reduction response delay is occurring in the second passage, wherein
- the pressure-reduction response-delay reducing section opens the pressure-reducing valve if it is determined that the pressure reduction response delay is occurring.

10. The vehicle brake system according to claim 8, further comprising:
- an opening degree correction section that corrects an opening degree command value of the pressure reduction control valve to eliminate the influence of opening the pressure-reducing valve on the hydraulic pressure in the second passage, wherein
- the pressure reduction control valve is a linear control valve that controls the opening degree thereof according to the opening degree command value.

11. The vehicle brake system according to claim 10, further comprising:

a regenerative braking unit that substitutes regenerative braking force of an electric motor for part of the braking force applied to the plurality of wheels of the vehicle; and a cooperative control unit that performs cooperative control of the hydraulic braking force and the regenerative braking force, wherein, when the cooperative control unit is performing the cooperative control of the hydraulic braking force and the regenerative braking force, the opening degree correction section corrects the opening degree command value based on the hydraulic pressure in the second passage and the time during which the pressure-reducing valve is opened.

12. The vehicle brake system according to claim 10, wherein the hydraulic pressure source includes a master cylinder that generates pressure when the brake pedal is depressed, and the vehicle brake system further comprises a master cylinder pressure sensor that detects the pressure generated by the master cylinder, and wherein further, when the cooperative control unit is not performing the cooperative control of the hydraulic braking force and the regenerative braking force, the opening degree correction section corrects the opening degree command value, based on the pressure generated by the master cylinder.

13. A vehicle brake system for applying braking force to a plurality of wheels of a vehicle, comprising:

a wheel cylinder, provided at each wheel, that produces the braking force by using hydraulic pressure;

a hydraulic pressure source that supplies hydraulic fluid that has been pressurized;

a hydraulic pressure supply passage that supplies hydraulic pressure from the hydraulic pressure source to the wheel cylinder;

a pressure increase control valve, which is disposed in the hydraulic pressure supply passage, that supplies hydraulic pressure from the hydraulic pressure source to the wheel cylinder according to operation of a brake pedal;

a communication valve that is placed in a channel of the hydraulic fluid extending from the pressure increase control valve to the wheel cylinder, and that separates the channel, as needed, into an upstream-side first passage that communicates with at least one wheel cylinder, and a downstream-side second passage that communicates with the wheel cylinder other than the wheel cylinder that communicates with the first passage, wherein the first passage is closer to the pressure increase control valve than the second passage;

a pressure-reducing passage that discharges the hydraulic fluid from the wheel cylinder;

a pressure reduction control valve, which is disposed between the pressure-reducing passage and the first passage, that controls the flow of the hydraulic fluid that is discharged from the wheel cylinder;

a pressure-reducing valve placed between the pressure-reducing passage and each wheel cylinder;

a pressure sensor that detects the hydraulic pressure in the second passage;

a pressure-reduction response-delay reducing section that, when the pressure reduction control of the wheel cylinder is performed using the pressure reduction control valve based on the hydraulic pressure in the second passage, opens, for a predetermined period of time, the pressure-reducing valve assigned to the wheel cylinder that communicates with the second passage; and an opening degree correction section that corrects an opening degree command value of the pressure reduction control valve to eliminate the influence of opening the pressure-reducing valve on the hydraulic pressure in the second passage, wherein the pressure reduction control valve is a linear control valve that controls the opening degree thereof according to the opening degree command value.

14. The vehicle brake system according to claim 13, further comprising:

a regenerative braking unit that substitutes regenerative braking force of an electric motor for part of the braking force applied to the plurality of wheels of the vehicle; and a cooperative control unit that performs cooperative control of the hydraulic braking force and the regenerative braking force, wherein, when the cooperative control unit is performing the cooperative control of the hydraulic braking force and the regenerative braking force, the opening degree correction section corrects the opening degree command value based on the hydraulic pressure in the second passage and the time during which the pressure-reducing valve is opened.

15. The vehicle brake system according to claim 14, wherein the hydraulic pressure source includes a master cylinder that generates pressure when the brake pedal is depressed, and the vehicle brake system further comprises a master cylinder pressure sensor that detects the pressure generated by the master cylinder, and wherein further, when the cooperative control unit is not performing the cooperative control of the hydraulic braking force and the regenerative braking force, the opening degree correction section corrects the opening degree command value, based on the pressure generated by the master cylinder.

* * * * *